US009663684B2

(12) United States Patent
Bartusiak et al.

(10) Patent No.: US 9,663,684 B2
(45) Date of Patent: May 30, 2017

(54) HAND-TEARABLE MASKING TAPE WITH SILICONE-CONTAINING LOW ADHESION BACKSIZE

(75) Inventors: Joseph T. Bartusiak, Osseo, MN (US); Ramesh C. Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/474,133

(22) Filed: May 17, 2012

(65) Prior Publication Data
US 2013/0025779 A1 Jan. 31, 2013

Related U.S. Application Data

(60) Provisional application No. 61/512,218, filed on Jul. 27, 2011.

(51) Int. Cl.
B32B 7/12 (2006.01)
C09J 7/02 (2006.01)

(52) U.S. Cl.
CPC ............ C09J 7/0271 (2013.01); C09J 7/025 (2013.01); C09J 2201/20 (2013.01); C09J 2203/31 (2013.01); C09J 2407/00 (2013.01); C09J 2423/006 (2013.01); C09J 2423/046 (2013.01); C09J 2433/005 (2013.01); C09J 2483/005 (2013.01); Y10T 428/14 (2015.01); Y10T 428/15 (2015.01)

(58) Field of Classification Search
CPC ........................ C09J 2201/20; C09J 2203/31
See application file for complete search history.

(56) References Cited

U.S. PATENT DOCUMENTS

| 3,011,988 | A | | 12/1961 | Luedke | |
|---|---|---|---|---|---|
| 4,135,023 | A | * | 1/1979 | Lloyd et al. ................ | 428/167 |
| 4,898,762 | A | | 2/1990 | Brown | |
| 5,032,460 | A | * | 7/1991 | Kantner ............. | C08F 283/122 |
| | | | | | 428/447 |
| 5,414,969 | A | * | 5/1995 | Krejci et al. ................ | 52/311.3 |
| 5,492,599 | A | * | 2/1996 | Olson et al. ................ | 162/137 |
| 5,616,387 | A | * | 4/1997 | Augst et al. ................ | 428/43 |
| 6,541,109 | B1 | * | 4/2003 | Kumar et al. ............... | 428/352 |
| 6,635,334 | B1 | * | 10/2003 | Jackson et al. ............. | 428/136 |
| 6,641,805 | B1 | | 11/2003 | Morita et al. | |
| 2003/0207105 | A1 | | 11/2003 | Strobel | |
| 2003/0215628 | A1 | | 11/2003 | Ma | |
| 2004/0165944 | A1 | * | 8/2004 | Varanese ............ | B65D 5/4233 |
| | | | | | 403/266 |
| 2004/0175527 | A1 | * | 9/2004 | Shiota et al. ............... | 428/43 |
| 2005/0045265 | A1 | | 3/2005 | Pannell | |
| 2005/0058829 | A1 | * | 3/2005 | Ukei et al. .................. | 428/343 |
| 2006/0029796 | A1 | | 2/2006 | Ukei | |
| 2006/0036024 | A1 | * | 2/2006 | Yang ................... | C09D 133/066 |
| | | | | | 524/556 |
| 2007/0212520 | A1 | | 9/2007 | Furumori et al. ........... | 428/134 |
| 2008/0014410 | A1 | | 1/2008 | Johnston | |
| 2008/0095979 | A1 | * | 4/2008 | Hatanaka et al. ........... | 428/137 |
| 2009/0202772 | A1 | | 8/2009 | Vanderzanden | |
| 2012/0231199 | A1 | * | 9/2012 | Bartusiak et al. ........... | 428/43 |
| 2014/0044912 | A1 | * | 2/2014 | Clarke et al. ............... | 428/43 |
| 2014/0287642 | A1 | * | 9/2014 | Kumar ................. | C09J 7/025 |
| | | | | | 442/290 |
| 2015/0010700 | A1 | * | 1/2015 | Bartusiak et al. ........... | 427/177 |
| 2015/0166844 | A1 | * | 6/2015 | Clarke ................. | B29B 11/12 |
| | | | | | 428/43 |

FOREIGN PATENT DOCUMENTS

| EP | 0 373 646 | | 6/1990 | |
|---|---|---|---|---|
| EP | 1 516 898 | B1 | 11/2009 | |
| GB | 1507935 | A * | 4/1978 | ........ G03G 15/2074 |
| JP | 06285978 | A * | 10/1994 | |
| JP | 09-316402 | A | 12/1997 | |
| JP | 2001-172586 | | 3/2000 | |
| JP | 2002-302654 | A | 10/2002 | |
| JP | 2002-317161 | | 10/2002 | |
| JP | 3514790 | | 3/2004 | |
| WO | WO 0144398 | | 6/2001 | |
| WO | WO 0185865 | | 11/2001 | |
| WO | WO 2012/091742 | | 7/2012 | |

OTHER PUBLICATIONS

Brochure titled "Reactive Silicones: Forging New Polymer Links" from Gelest, retrived on Oct. 13, 2013.*
Brochure titled "Mercapto Functional Silicone Fluids" from Genesee Polymers, retrived via WayBackMachine, Sep. 9, 2009.*
Brochure titled "Reference: Polymer Properties" from Aldrich, retrived on Oct. 13, 2013.*
Istvan Benedek and Luc. J. Heymans, "Pressure-Sensitive Adhesives Technology", 1997, Marcel Dekker Inc., Chapter 5, pp. 120-122.*
Definition of "Monolithic" from Merriam-Webster Dictionary, retrived on Jun. 3, 2015.*
Rick, F Tate et al., "HDPE Blending Technology for Enhanced LDPE Film Properties", ANTEC 2000 Conference Proceedings, vol. III Special Areas, May 7-11, 2000.*
Bartusiak, Joseph T., U.S. Appl. No. 61/512,225, entitled Hand-Tearable Masking Tape with Low Adhesion Backsize, filed Jul. 27, 2011.
International Search Report, PCT/US2012/047573, mailed Jan. 31, 2013, 3 pages.
Kamel, N., "Paper Tape Release Coatings: Challenges and Solutions", Pressure Sensitive Tape Council, Naperville, IL (2007), 12 pages.
Satas, D., "Release Coatings"; Chapter 23 (pp. 585-600) in "Handbook of Pressure Sensitive Adhesive Technology", 1989, Van Nostrand Reinhold, New York.
Satas, D., "Silicone Release Coatings"; Chapter 24 (pp. 601-626) in "Handbook of Pressure Sensitive Adhesive Technology", 1989, Van Nostrand Reinhold, New York.
Extended European Search Report, EP12818050.2 (PCT/US2012047573), Feb. 25, 2015, 3 pages.

* cited by examiner

Primary Examiner — Anish Desai
(74) Attorney, Agent, or Firm — Kenneth B. Wood

(57) ABSTRACT

A hand-tearable masking tape, comprising a plastic backing with a low adhesion backsize on the first major side of the backing and a pressure-sensitive adhesive on the second major side of the backing; wherein the second major side of the backing comprises a microstructured hand-tear pattern and wherein the low adhesion backsize comprises the reaction product of a mercapto-functional silicone macromer.

17 Claims, 7 Drawing Sheets

HAND-TEARABLE MASKING TAPE WITH SILICONE-CONTAINING LOW ADHESION BACKSIZE

CROSS-REFERENCE TO RELATED APPLICATION

This application claims the benefit of U.S. Provisional Patent Application No. 61/512,218, filed Jul. 27, 2011.

BACKGROUND

Masking tapes have been used for some time in the painting of surfaces. Masking tapes are often comprised of creped paper with a pressure-sensitive adhesive on one surface.

SUMMARY

Disclosed herein is a hand-tearable masking tape, comprising a plastic backing with a low adhesion backsize on the major first side of the backing and a pressure-sensitive adhesive on the second major side of the backing; wherein the second major side of the backing comprises a microstructured hand-tear pattern and wherein the low adhesion backsize comprises the reaction product of a mercapto-functional silicone macromer.

In one aspect, disclosed herein is a hand-tearable masking tape, comprising: a polyolefinic backing comprising a longitudinal axis and a transverse width and axis, and comprising a first major side and an oppositely-facing second major side, wherein a pressure-sensitive adhesive is disposed on the second major side of the backing and wherein the second major side of the backing comprises a microstructured hand-tear pattern comprising a multiplicity of lines of weakness at least some of which comprise a long axis that is oriented at least generally transversely to the backing; and wherein a low adhesion backsize is disposed on the first major side of the backing, the low adhesion backsize comprising the reaction product, with one or more (meth)acrylic monomers and/or oligomers and/or vinyl monomers and/or oligomers, of a mercapto-functional silicone macromer having the general formula of Formula IIa, IIb, or IIc:

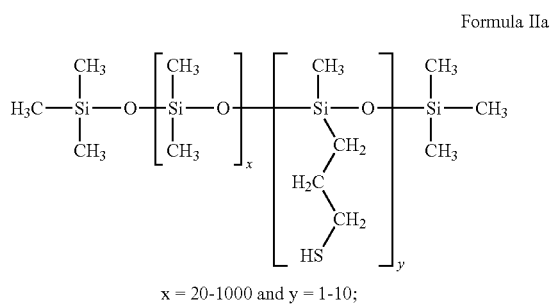

Formula IIa x = 20-1000 and y = 1-10;

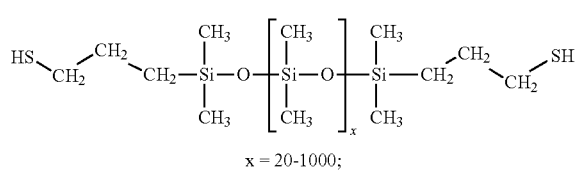

Formula IIb x = 20-1000;

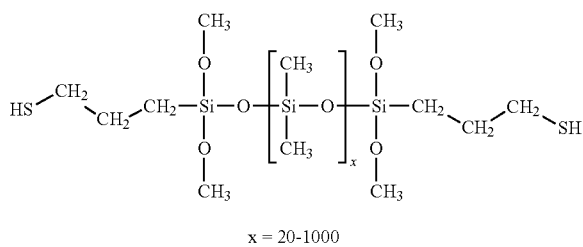

Formula IIc x = 20-1000 or, combinations or mixtures or any of the above silicone macromers.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", "bottom", "upper", "lower", "under", "over", "front", "back", "up" and "down", and "first" and "second" may be used in this disclosure, it should be understood that those terms are used in their relative sense only unless otherwise noted. The terms outward and inward refer to directions generally away from the interior of backing 2 of tape 1, and toward the interior of backing 2 of tape 1, respectively.

DETAILED DESCRIPTION

Figure 1:
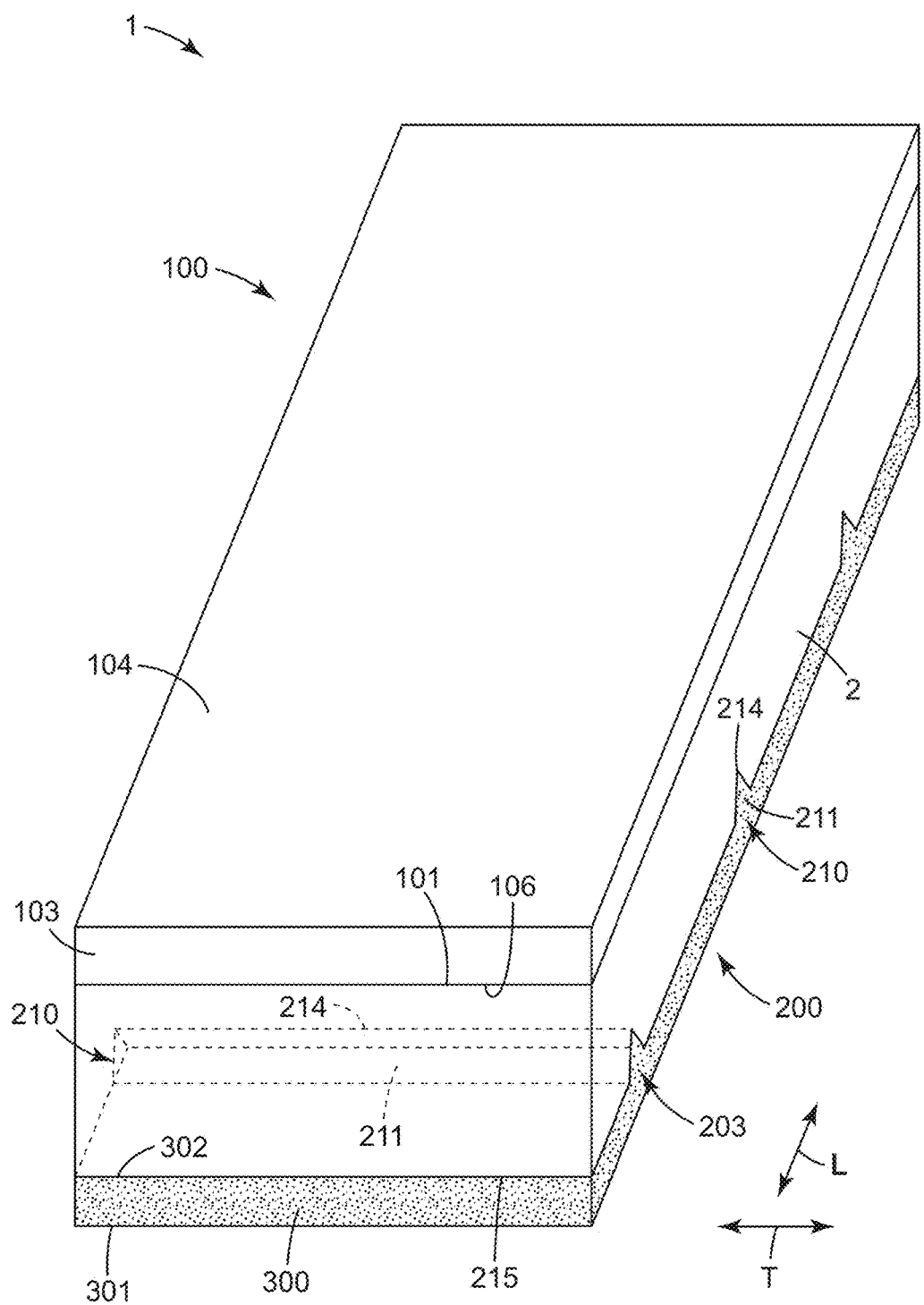
FIG. 1 is a perspective view, from the first major side, of a portion of an exemplary microstructured tape.
Figure 2:
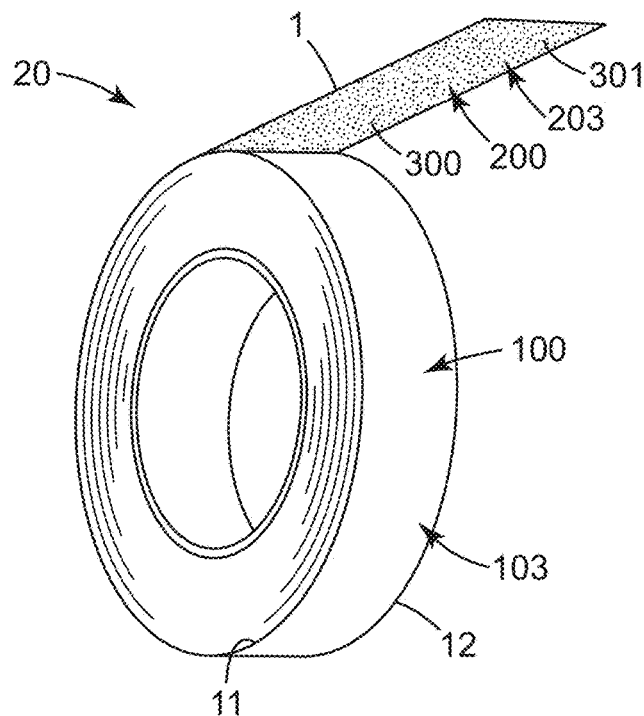
FIG. 2 is a perspective view of an length of exemplary microstructured tape, in the form of a roll.
Figure 3:
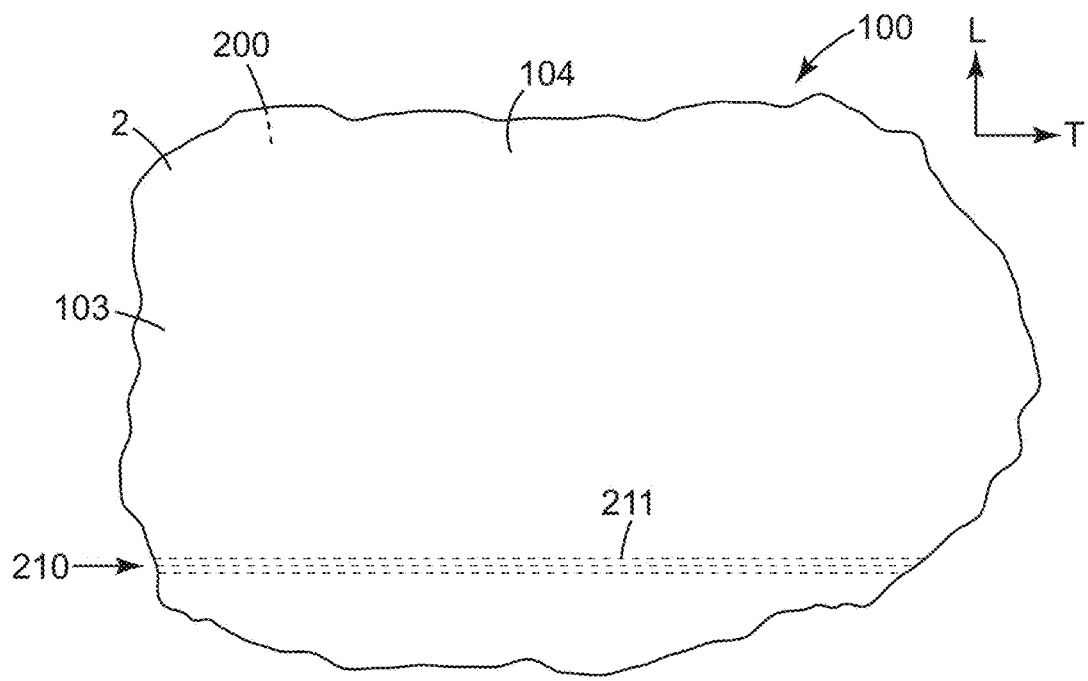
FIG. 3 is a plan view of a portion of the first major side of the backing of the exemplary microstructured tape of FIG. 1.
Figure 4:
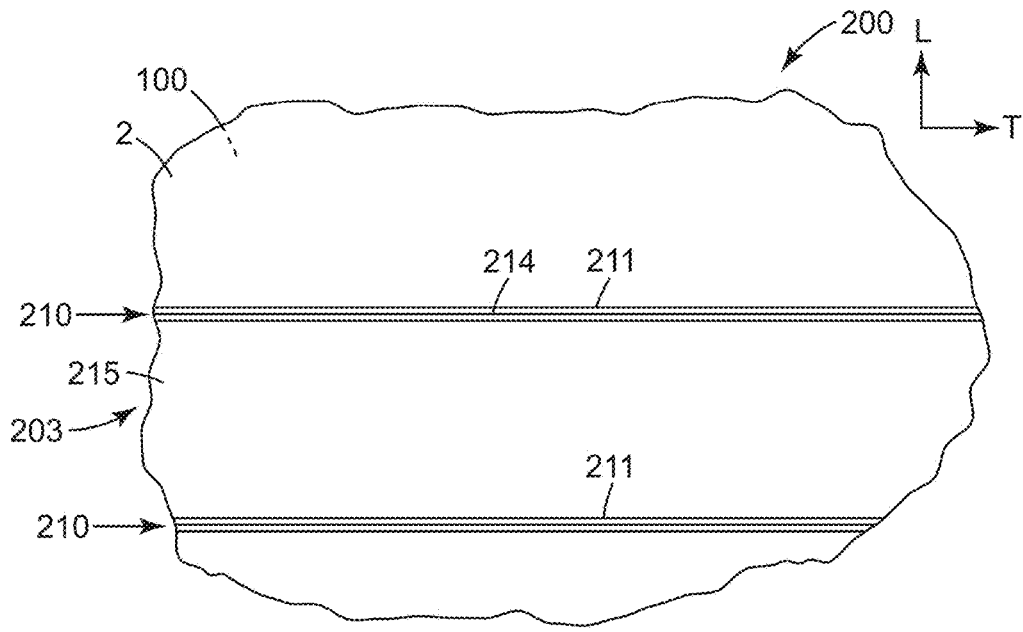
FIG. 4 is a plan view of a portion of the second major side of the backing of the exemplary microstructured tape of FIG. 1.

Shown in FIG. 1 is a perspective view, from the first major side, of a portion of an exemplary microstructured tape 1 comprising a backing 2. Shown in FIG. 2 is a perspective view of microstructured tape 1 in the form of a roll 20. FIGS. 3 and 4 contain plan views of the first and second major sides of backing 2, respectively. (In these and all other figures in which they appear, the term "T" designates the transverse axis, and the term "L" designates the longitudinal axis, of tape 1 and backing 2 thereof.) Tape 1 and backing 2 thereof comprise a longitudinal axis and length, a transverse axis and width and minor transverse edges 11 and 12 (i.e., e.g., as seen in FIG. 2), and a thickness. As shown in FIGS. 1 and 3, backing 2 comprises first major side 100 that comprises a low adhesion backsize 103. As shown in FIGS. 1 and 4, backing 2 comprises second major side 200 that comprises microstructured hand-tear pattern 203. As shown in FIGS. 1 and 2, pressure-sensitive adhesive 300 is disposed on second major side 200 of backing 2, e.g. with second major adhesive surface 302 of pressure-sensitive adhesive 300 in contact with, and adhesively adhered to, second major surface 215 of backing 2. As shown in FIG. 2, microstructured tape 1 may be conveniently provided in an elongate length in the form of a roll, e.g. a self-wound roll without a release liner, from which a length of tape 1 may be removed by hand-tearing (although other methods involving scissors or other cutting implements may be used if desired). First major adhesive surface 301 of pressure-sensitive adhesive may then be used to adhere the length of tape 1 to a surface portion that is desired to be masked. An adjacent surface portion may then be painted without paint penetrating onto the masked surface portion.

Microstructured Hand-Tear Pattern

By microstructured tape is meant that tape 1 comprises a microstructured hand-tear pattern 203 comprising a multiplicity of lines of weakness 210 (as shown in exemplary manner in FIGS. 1 and 4) that are present on second major side 200 of backing 2 and that comprise a long axis that is oriented at least generally transversely to backing 2 and that extend generally across the width of backing 2, and that are spaced along the longitudinal axis of backing 2. Lines of weakness 210 may enhance the ability of backing 2 of tape 1 to be hand-torn at least generally transversely across its width so as to remove a length of backing 2 and tape 1 from a larger length (e.g., from a roll). By at least generally transversely (as used here and elsewhere herein) it is not meant that lines of weakness 210 must necessarily be oriented in strict alignment with the transverse axis of backing 2 (e.g., in the specific manner shown in FIGS. 1-3), but rather encompasses any design in which lines of weakness 210 are at any orientation within plus or minus about 45 degrees of the transverse axis of backing 2. In further embodiments, lines of weakness 210 (i.e., a long axis thereof) may be oriented within plus or minus about 30 degrees, plus or minus about 20 degrees, or plus or minus about 10 degrees, of the transverse axis of backing 2. In specific embodiments, lines of weakness 210 may be oriented in strict alignment with the transverse axis of backing 2, meaning that they are oriented within plus or minus about 5 degrees of the transverse axis of backing 2.

Each individual line of weakness 210 may be a continuous line of weakness that is provided by a recess, or may be a discontinuous line of weakness that is provided collectively by a multiplicity of recesses. By a recess is meant a feature at least some of whose surface(s) are recessed below (i.e., inward toward the interior of backing 2) major surface 215 (which may be, but is not necessarily, a generally flat plano surface) of second major side 200 of backing 2, so as to comprise an open-ended, outward-facing cavity (e.g., a depression, divot, notch, trench, groove, furrow, hole, etc.). Recesses as defined herein do not encompass interior cavities, voids, pores or the like as might be present in some materials (e.g., microporous materials, foams and the like), nor do they encompass such pores as might be present on the surface of open-celled foams and the like. By microstructured hand-tear pattern is further meant that the recesses that provide lines of weakness 210 comprise predetermined, molded structures (e.g., as obtained by molding a polymeric thermoplastic resin against a tooling surface that comprises the negative of the recesses desired to be provided on second major side 200 of backing 2) with dimensions ranging from about 5 to about 200 microns in at least two orthogonal directions. One of these orthogonal directions is normal to the plane of backing 2 thus this dimension comprises the recess depth. By way of example, for a line of weakness 210 that is provided by a recess comprised of an elongate groove 211 as shown in FIGS. 1 and 4, the recess depth is the distance that the deepest (inwardmost) point 214 of groove 211 is spaced inward from second major surface 215 of backing 2, along an axis normal to the major plane of backing 2. Often, the lateral width of groove 211 (lateral meaning in a direction across the width of the groove, which direction may often be generally aligned with the longitudinal axis of backing 2) may comprise the second, orthogonal direction. Thus, if the depth of groove 211 and the lateral width of groove 211 are both in between about 5 and about 200 microns at any location along the length of groove 211, groove 211 is by definition a microstructured feature irrespective of the fact that it may have an extremely long length. In some embodiments, the recesses that provide lines of weakness 210 are present in regular, predictable, repeating patterns. It will be appreciated that molded microstructures (e.g. recesses) as disclosed herein are distinguished from features that are achieved by post-processing (e.g., by coating, depositing, ablation, perforation, punching, drilling, and the like).

Figure 5:
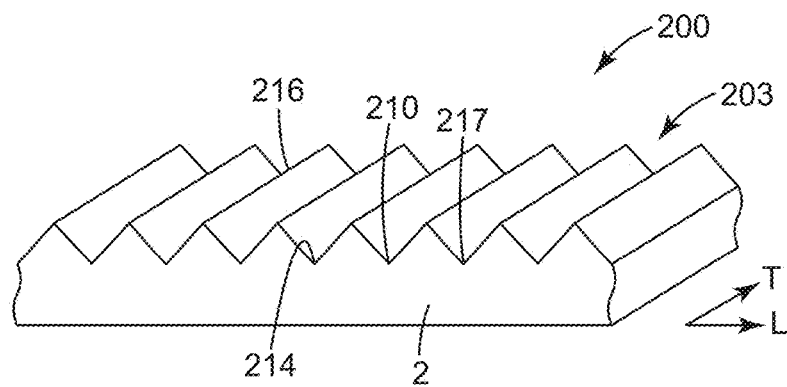
FIG. 5 is a perspective view of a portion of the second major side of the backing of another exemplary microstructured tape.
Figure 6:
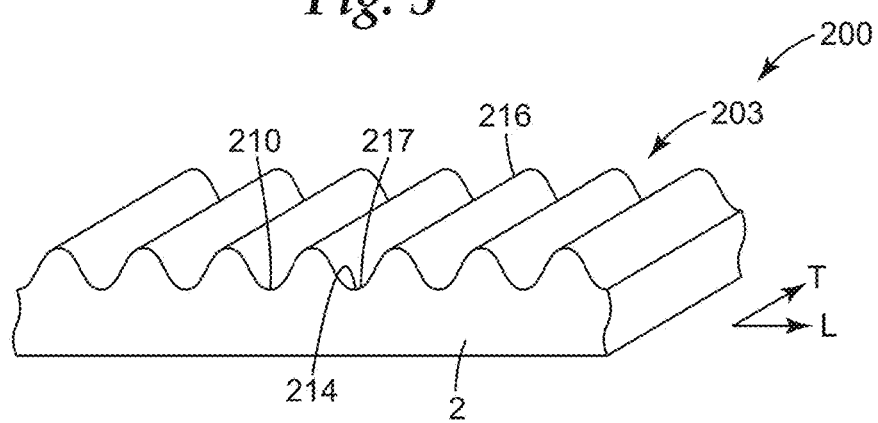
FIG. 6 is a perspective view of a portion of the second major side of the backing of another exemplary microstructured tape
Figure 7:
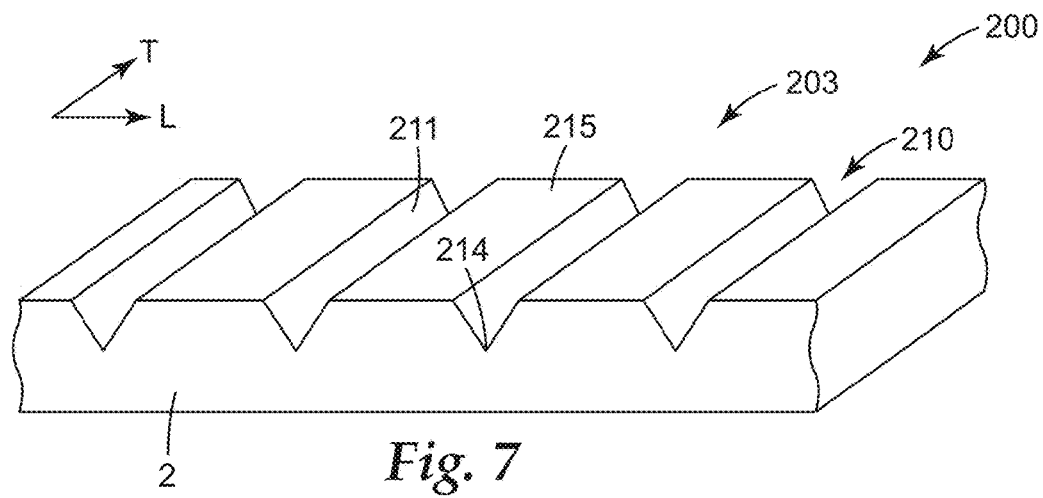
FIG. 7 is a perspective view of a portion of the second major side of the backing of the exemplary microstructured tape of FIG. 1.

The presence of a line of weakness 210 as provided by one or more recesses does not imply that a discernible flat (plano) surface must necessarily be present on second major side 200 of backing 2. Rather, in some embodiments second major side 200 may comprise a hand-tear pattern 203 that, for example, comprises lines of weakness 210 in the form of grooves (valleys) 217 interspersed between ridges 216, e.g. as shown in the exemplary embodiments of FIGS. 5 and 6.

In such cases, valleys 217 comprise recesses, and for purposes of determining whether a given valley is microstructured, its depth can be considered to be the distance (measured normal to the plane of backing 2) from the outwardmost tip of ridge 216 to the inwardmost (deepest) point 214 of valley 217, and its width can be considered to be the distance (measured parallel to the plane of backing 2) from a tip of a ridge 216 to the tip of an adjacent ridge 216. Thus, if such distances fall in the range of about 5 microns to about 200 microns, such features comprise microstructured recesses as defined herein. Furthermore, ridges 216 and valleys 217 do not necessarily have to have sharp peaks and floors, respectively. Rather, either or both can be rounded, as in the exemplary embodiment of FIG. 6, or can have flat valley floors and/or ridge tops, etc. In summary, any microstructured pattern with an undulating (e.g. fluted, corrugated, etc.) surface that provides at least generally transversely-oriented lines of weakness 210 can be utilized.

In some embodiments, a recess that provides a continuous line of weakness 210 may comprise a continuous elongate groove 211 that extends continuously from one minor edge 11 of backing 2 to other minor edge 12 of backing 2. In various embodiments, the depth of groove 211 may be at least about 10 microns, at least about 15 microns, or at least about 20 microns. In further embodiments, the depth of groove 211 may be at most about 60 microns, at most about 50 microns, or at most about 40 microns. In various embodiments, the width of groove 211 may be at least about 20 microns, at least about 40 microns, or at least about 60 microns. In further embodiments, the width of groove 211 may be at most about 140 microns, at most about 120 microns, or at most about 100 microns. The width of groove 211 may be constant along the length of groove 211, or it may vary along the length. In various embodiments, the center-to-center spacing between grooves 211 (in the longitudinal direction down backing 2) may be at least about 0.40 mm, at least about 0.60 mm, or at least about 0.80 mm. In further embodiments, the spacing of grooves 211 may be at most about 1.4 mm, at most about 1.2 mm, or at most about 1.0 mm. The spacing between grooves 211 may be constant down the length of backing 2, or may vary. Grooves 211 may be interspersed (in the longitudinal direction down backing 2) by generally flat portions of surface 215 (as in FIGS. 1 and 3) or by outwardly-protruding ridges 216, or both, and/or by any other features.

Figure 8:
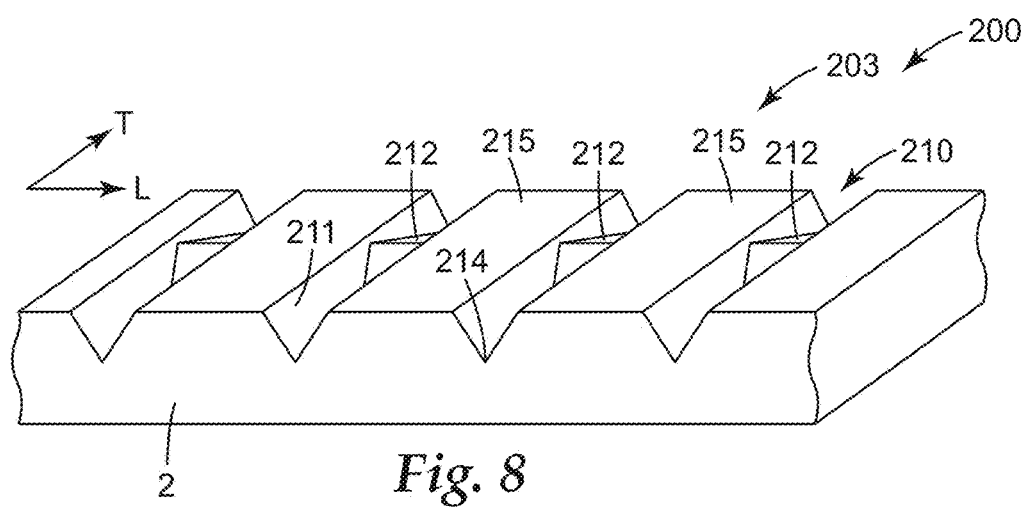
FIG. 8 is a perspective view of a portion of the second major side of the backing of another exemplary microstructured tape.
Figure 9:
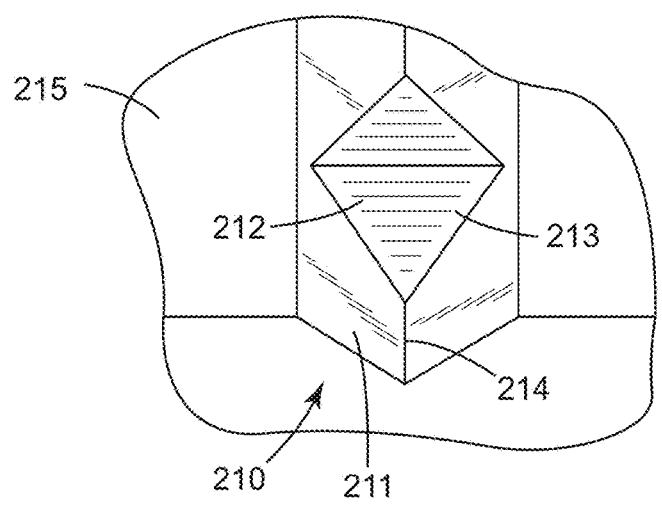
FIG. 9 is a perspective enlarged view of a portion of the second major side of the backing of FIG. 8.

Grooves 211 may comprise optional features if desired, such as bridging structures 212 as shown in FIGS. 8 and 9. Such bridging structures, which are integrally molded with hand-tear pattern 203 and backing 2, may be spaced periodically down the length of groove 211, and may extend across at least a portion of the lateral width of groove 211 (e.g., in a direction generally aligned with the longitudinal axis of backing 2). Such bridging structures may e.g. enhance the longitudinal strength of backing 2 without unacceptably reducing the ability of grooves 211 to perform as lines of weakness 210. In a particular embodiment of this general type, bridging structure 212 may be designed as illustrated in FIG. 8 and shown in magnified view in FIG. 9. In such designs, bridging structure 212 may comprise two major sloping surfaces 213 that meet at a topmost ridge that is oriented substantially laterally across the width of groove 211. However, bridging structure 212 may have any suitable design (e.g., with a generally flat outward-facing (top) surface, with a rounded top surface, etc).

Figure 10:
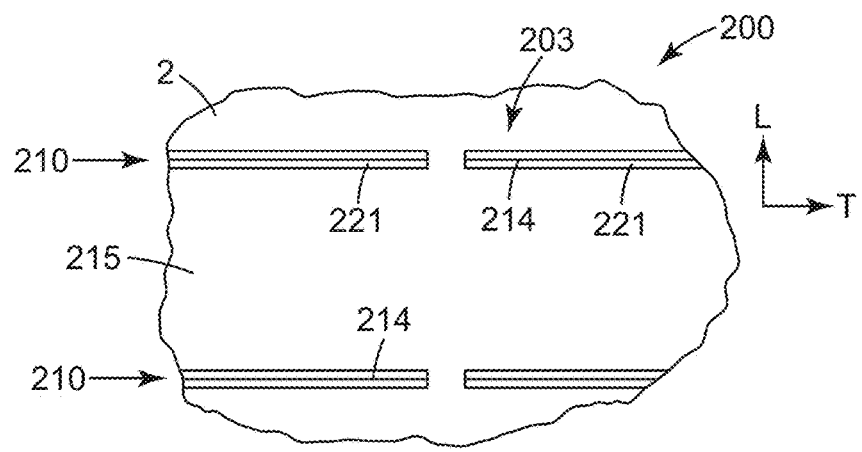
FIG. 10 is a plan view of a portion of the second major side of another exemplary microstructured tape.
Figure 11:
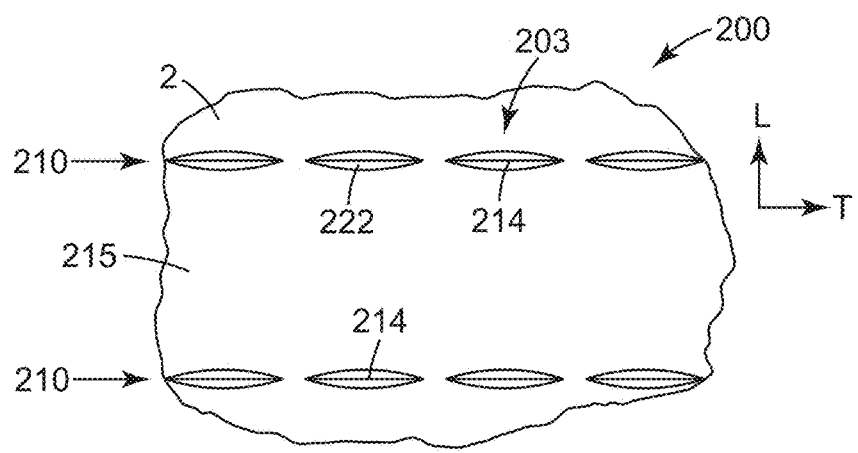
FIG. 11 is a plan view of a portion of the second major side of the backing of another exemplary microstructured tape.
Figure 12:
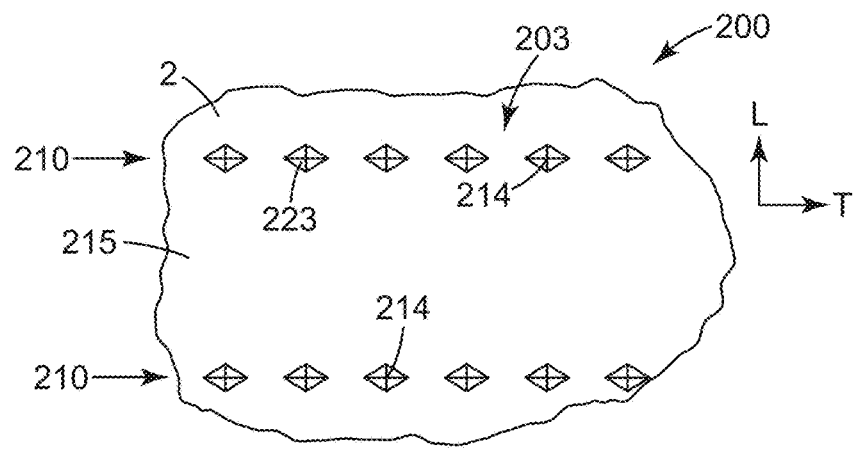
FIG. 12 is a plan view of a portion of the second major side of the backing of another exemplary microstructured tape.
Figure 13:
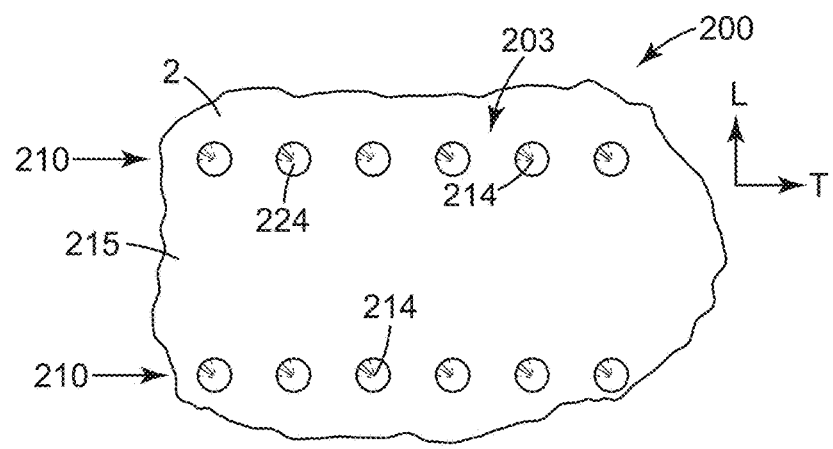
FIG. 13 is a plan view of a portion of the second major side of the backing of another exemplary microstructured tape.

In some embodiments, lines of weakness 210 may be discontinuous, that is, provided not by a single recess but rather by a multiplicity of (e.g., two or more) recesses, spaced along a long axis (which may be, but does not necessarily have to be, a generally linear or strictly linear path) of discontinuous line of weakness 210 is that oriented at least generally transversely to backing 2, and acting in combination. In a specific example exemplified in FIG. 10, discontinuous grooves 221 may be provided that are interrupted by gaps (e.g., bearing plano surface 215) and that thus do not extend continuously across the entire width of backing 2. In a modification of this approach shown in FIG. 11, a discontinuous line of weakness 210 is provided collectively by a multiplicity of elongate oval recesses 222 that are aligned generally linearly across the transverse width of backing 2, each oval recess comprising a long axis that is generally oriented across the transverse width of backing 2. In a slight modification of this approach shown in FIG. 12, recesses 223 comprise diamond-shaped recesses aligned generally linearly across the transverse width of backing 2, each diamond-shaped recess comprising a long axis that is generally oriented across the transverse width of backing 2. It should be noted that such approaches do not necessarily require that individual recesses comprise a long axis that is generally oriented across the transverse width of backing 2, however. Thus, in the exemplary embodiment of FIG. 13, lines of weakness 210 are collectively provided by rows of generally circular recesses 224. (In FIG. 13 and in FIGS. 7-12, the deepest-inward point of a recess is designated by the reference number 214).

In any of these embodiments comprising discontinuous lines of weakness comprised of a multiplicity of recesses, the depth of a recess may be at least about 10 microns, at least about 15 microns, or at least about 20 microns. In further embodiments, the recess depth may be at most about 60 microns, at most about 50 microns, or at most about 40 microns. If a recess has a long axis, the width of the recess may be constant along the length of the recess (as in FIG. 10), or it may vary along the length (as in FIGS. 11 and 12). In various embodiments, the width of a recess (which may be measured at any suitable location of the recess, and may be the diameter in the case of a generally circular recess) may be at least about 20 microns, at least about 40 microns, or at least about 60 microns. In further embodiments, the width of a recess may be at most about 140 microns, at most about 120 microns, or at most about 100 microns. In various embodiments, the edge-to-edge spacing between nearest edges of adjacent recesses of a discontinuous line of weakness (e.g., as measured generally along the transverse axis of backing 2) may be at least about 10 microns, at least about 20 microns, or at least about 30 microns. In further embodiments, the edge-to-edge spacing between recesses may be at most about 200 microns, at most about 100 microns, or at most about 60 microns.

In any of the aforementioned continuous or discontinuous lines of weakness provided by one or more recesses, the depth of an individual recess may vary; and/or different recesses may comprise different depths (whether variable or constant). Recesses may be of different widths or of the same width. A recess width may vary along its inward-outward depth relative to the plane of backing 2 (e.g., when viewed in cross section), e.g. so that it is tapered as in grooves 211 of FIG. 1, and/or a recess can be any suitable shape when viewed in cross section. That is, a recess may comprise a constant width along its depth, may comprise a flat bottom, an arcuate bottom, etc., and/or flat walls, sloped walls, arcuate walls etc. The recess may or may not be symmetric when viewed in cross section. All that is required is that the recesses be designed and arranged with appropriate geometry (e.g., depths, widths, spacings, etc.) so as to, individually or collectively, provide a line of weakness 210 that imparts the herein-described ability to hand-tear backing 2 at least generally transversely across its width.

Whether lines of weakness are continuous or discontinuous (with mixtures of both being encompassed within the disclosures herein), the spacing between individual lines of weakness 210 may be constant down the length of backing 2, or may vary. All of the lines of weakness do not have to be oriented at the same angle (e.g., relative to the transverse axis of backing 2). Furthermore, it should be noted that the concept of a multiplicity of lines of weakness as disclosed herein does not imply that the recess or recesses that individually or collectively provide a particular line of weakness 210 must necessarily be aligned strictly in a straight line. Rather, a continuous line of weakness 210 may be provided by a continuous groove that is somewhat arcuate, wavy, sinusoidal, sawtooth, or the like, as long as its overall path is at least generally transversely across backing 2 in the manner disclosed above. Similarly, a multiplicity of recesses arranged along a somewhat arcuate, wavy, sinusoidal, sawtoothed etc. path may likewise provide a discontinuous line of weakness 210. In some embodiments, of course, a generally linear, or strictly linear, path may be desired.

Lines of weakness 210 as described herein thus may enhance or promote the ability of backing 2 to be torn by hand in such a way that the propagating tear is steered in a desired (e.g., an at least generally transverse) direction, e.g. along a desired path. However, it will be appreciated that in some cases (e.g., as might occur in the case of discontinuous lines of weakness each comprised of a multiplicity of recesses, in the case of continuous lines of weakness that are spaced closely together along the longitudinal axis of backing 2, etc.) the propagation of a tear may not be directly along a strictly straight-line path. For example, a tear may propagate along one line of weakness for a portion of the way across the transverse width of backing 2, and may then jump to a second, adjacent line of weakness (e.g., a recess thereof) and then continue propagating transversely along the second line of weakness, and so on. Such phenomena may be acceptable as long as it does not cause the tear propagation to unacceptably deviate from a desired (e.g. an at least generally transverse) path across the width of backing 2. Thus, the concept of a multiplicity of lines of weakness is used broadly herein, and encompasses cases in which it may not necessarily be easy, or possible, to discern exactly which particular line of weakness may be followed when backing 2 is hand-torn. All that is required is that the microstructured recesses, individually or collectively, are capable of causing a tear to initiate and propagate at least generally transversely across the width of backing 2 as described herein. In some embodiments, of course, it may be preferred that the tear propagation occur generally, or completely, along a single line of weakness.

It will be appreciated that lines of weakness 210 may enhance the ability of a hand-tear to be initiated, in addition to enhancing the ability of a propagating hand-tear to be steered in a desired direction. As such, in some embodiments it may be advantageous for a recess that comprises at least a portion of a line of weakness to be present at minor edge 11 of backing 2, and likewise for a recess to be present at minor edge 12 of backing 2. This may be provided, for example, by a line of weakness that is a continuous groove (such as, e.g., exemplary groove 211 of FIGS. 1-3) that extends to minor edges 11 and 12 of backing 2. Or, in the case of a discontinuous line of weakness, the multiplicity of recesses that make up the line of weakness may be arranged such that a recess is present at minor edge 11 of backing 2, and that a recess is likewise present at minor edge 12 of backing 2. In either case, a line of weakness 210 is provided that extends across the entire transverse width of second major side 200 of backing 2, from one minor edge 11 to other minor edge 12.

Backing

Backing 2 and microstructured hand tear pattern 203 of second major side 200 thereof, are defined herein as constituting a monolithic plastic unit made of a monolithic plastic material. By this is meant that the portions of material (e.g., surfaces) that define the recessed features (e.g., grooves, valleys, holes, etc.) that provide lines of weakness 210 of hand-tear pattern 203 of second major side 200 are integrally connected to backing 2 and were formed by being molded therewith. In some embodiments, the portion of the monolithic plastic material that makes up backing 2 and first major surface 101 thereof, and the portion of the monolithic plastic material whose surfaces define the recesses of lines of weakness 210 of hand-tear pattern 203 of second major side 200, are of the same composition. In various embodiments, the overall thickness of backing 2, from second major surface 215 of second major side 200, to first major surface 101 of first major side 100, may be at least about 25 microns, at least about 50 microns, at least about 60 microns, or at least about 70 microns. In further embodiments, the overall thickness of backing 2 may be at most about 250 microns, at most about 140 microns, at most about 120 microns, or at most about 100 microns.

The plastic material of backing 2 is a moldable polymeric thermoplastic material that is not a foamed or porous material. In some embodiments, the plastic material may be noncellulosic, meaning that it contains less than about 5 wt. % cellulosic material (e.g., cellulose, paper, regenerated cellulose, wood fibers, wood flour, etc., with, in this context, cellulose acetate and the like not considered to be cellulosic materials). In particular embodiments, the plastic material may be melt-processable, e.g. extrudable. The moldable polymeric thermoplastic material may be made from, or include, any of a variety of materials. Homopolymers, copolymers and blends of polymers may be useful, and may contain a variety of additives. Suitable thermoplastic polymers may include, for example, polyolefins such as polypropylene or polyethylene; polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, and engineering polymers such as polyketones or polymethylpentanes. Mixtures of such polymers may also be used. In specific embodiments, the plastic material of backing 2 does not contain any vinyl-chloride-based polymers.

In some embodiments, the plastic material may be a polyolefinic material, meaning that the plastic material is made up of at least 80 wt. % polyalkene polymers, including any homopolymers, copolymers, blends, etc. thereof (not counting the weight of any mineral fillers and the like that may be present). In further embodiments, the plastic material may comprise at least 90 wt. %, at least 95 wt. %, or at least 98 wt. %, polyolefinic material. In specific embodiments, the plastic material consists essentially of polyolefinic material, noting that this requirement (in addition to not including the weight of any mineral fillers) does not preclude the presence of processing aids, plasticizers, antioxidants, colorants, pigments, and the like, at least some of which may contain some small level of non-polyolefinic material.

In some embodiments, the polyolefinic material may be a polyethylenic material, meaning that the polyolefinic material contains at least about 80 wt. % of polyethylene polymers (again, not counting the weight of any mineral fillers and the like that may be present). In further embodiments, the polyolefinic material may contain at least about 90 wt. %, at least about 95 wt. %, or at least about 98 wt. % of polyethylene polymers. (In this context, by polyethylene polymers are meant polymers comprised of at least 95% ethylene units. In some embodiments, the polyethylene polymers are polyethylene homopolymers.) In specific embodiments, the polyolefinic material consists essentially of polyethylene homopolymers, noting that this requirement does not preclude the presence of small amounts of additives and the like which may contain some small level of non-polyethylene polymers. In certain embodiments, the polyolefinic material may contain substantially no polypropylene (as well as substantially no non-olefinic polymers). (Those of ordinary skill will appreciate that as used herein, the term "substantially no" does not preclude the presence of some extremely low amount of material (e.g. 0.5% or less), as may occur e.g. when using large scale production equipment subject to customary cleaning procedures.)

Suitable polyethylene homopolymers for use in backing 2 may include e.g. high-density polyethylene, medium-density polyethylene, low-density polyethylene, linear low-density polyethylene, ultra-low-density polyethylene, and the like. In specific embodiments, the polyethylene homopolymers may consist essentially of a blend of low density polyethylene (LDPE, i.e. having a density of less than 0.93 g/cc) and high density polyethylene (HDPE, i.e. having a density of at least 0.94 g/cc). In particular embodiments, the LDPE may have a density of 0.92 g/cc or less. In particular embodiments, the HDPE may have a density of 0.96 or greater.

The LDPE and HDPE may be present at any suitable weight ratio. In various embodiments, the LDPE and HDPE may be present at a weight ratio of from about 10:90 LDPE:HDPE to about 90:10 LDPE:HDPE. In some embodiments, the weight ratio of LDPE to HDPE may be at most about 45:55, at most about 40:60, at most about 35:75, or at most about 30:70. In further embodiments, the weight ratio of LDPE to HDPE may be at least about 15:85, at least about 20:80, or at least about 25:75.

Within these general limits, a particular compositional range, extending generally from a weight ratio of 20:80 LDPE:HDPE to 40:60 LDPE:HDPE, has been found to unexpectedly enhance the handleability of tape 1. Specifically, it has been found that compositions within this range can impart sufficient stiffness to tape backing 2 to enhance the ability of tape 1 to be handled (in particular, the ability to unwind fairly long, e.g. up to 0.5 meter or more, lengths of the tape without the tape unacceptably cupping, drooping, bowing, etc.), while at the same time preserving the ability of tape 1 to be transversely hand torn, and also preserving the ability of tape 1 to be transversely curved, as is discussed in detail later herein. Such findings are presented in the Examples herein.

In some embodiments, the LDPE/HDPE blend may comprise one or more inorganic (e.g., particulate mineral) fillers, which may include e.g. calcium carbonate, kaolin, talc, silica, titanium dioxide, glass fibers, glass bubbles, and the like. Such fillers may be present e.g. at from about 0.05% to about 20% by weight of the total weight of the material of backing 2. Other additives may be included as desired for particular purposes.

Pressure-Sensitive Adhesive

Pressure-sensitive adhesive 300 is provided on second major side 200 of backing 2. Pressure-sensitive adhesives are normally tacky at room temperature and can be adhered to a surface by application of, at most, light finger pressure and thus may be distinguished from other types of adhesives that are not pressure-sensitive. A general description of useful pressure-sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Any suitable composition, material or ingredient can be used in pressure-sensitive adhesive 300. Pressure-sensitive adhesives often utilize one or more thermoplastic elastomers, e.g. in combination with one or more tackifying resins.

General categories of exemplary materials which may be suitable for use in pressure-sensitive adhesive 300 include e.g. elastomeric polymers based on (e.g., the reaction product of) acrylate and/or methacrylate materials, natural or synthetic rubbers, block copolymers, silicones, and so on. (As used herein, terms such as (meth)acrylate, (meth (acrylic), and the like, refer to both acrylic/acrylate, and methacrylic/methacrylate, monomer, oligomers, and polymers derived therefrom). Suitable polymers and/or monomer units therein may include, but are not limited to: polyvinyl ethers, polyisoprenes, butyl rubbers, polyisobutylenes, polychloroprenes, butadiene-acrylonitrile polymers, styrene-isoprene, styrene-butylene, and styrene-isoprene-styrene block copolymers, ethylene-propylene-diene polymers, styrene-butadiene polymers, styrene polymers, poly-alpha-olefins, amorphous polyolefins, polysiloxanes, ethylene vinyl acetates, polyurethanes, silicone-urea polymers, silicone-urethane polymers, polyvinylpyrrolidones, and any combinations thereof. Examples of suitable (meth) acrylic materials include polymers of alkyl acrylate or methacrylate monomers such as e.g. methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, octadecyl acrylate, octadecyl methacrylate, acrylic acid, methacrylic acid, acrylonitrile, and combinations thereof. Examples of suitable commercially available block copolymers include those available under the trade designation KRATON from Kraton Polymers, Houston, Tex. Any of these or other suitable materials may be used in any desired combination.

Any suitable tackifying resin or combination thereof may be used. Suitable tackifying resins may include e.g. wood rosins and hydrogenated derivatives thereof, tall oil rosins, terpene resins, phenolic resins, polyaromatics, petroleum-based resins, (e.g. aliphatic C5 olefin-derived resins) and so on. Those of ordinary skill will appreciate the variety of tackifying resins that are available, and will further appreciate that some elastomers may be self-tacky and thus may require little or no added tackifying resin. Additionally, pressure-sensitive adhesive 300 can contain additives such as plasticizers, fillers, antioxidants, stabilizers, pigments, and the like. Additional information on materials (thermoplastic elastomers, tackifying resins, and other additives) which may find use in pressure-sensitive adhesive 300 may be found e.g. in U.S. Pat. No. 6,632,522 to Hyde et al., which extensively discusses such materials and which is incorporated by reference herein for this purpose.

It may be convenient (e.g., for outdoor use), that the components of pressure-sensitive adhesive 300 be chosen so as to provide good adhesion to a surface, while also being removable under moderate force without leaving a residue, e.g. a visible residue. In certain embodiments, pressure-sensitive adhesive 300 may be natural-rubber-based, meaning that a natural rubber elastomer or elastomers make up at least about 20 wt. % of the elastomeric components of the adhesive (not including any filler, tackifying resin, etc.). In further embodiments, the natural rubber elastomer makes up at least about 50 wt. %, or at least about 80 wt. %, of the elastomeric components of the adhesive. In some embodiments, the natural rubber elastomer may be blended with one or more block copolymer thermoplastic elastomers (e.g., of the general type available under the trade designation KRATON from Kraton Polymers, Houston, Tex.). In specific embodiments, the natural rubber elastomer may be blended with a styrene-isoprene radial block copolymer), in combination with natural rubber elastomer, along with at least one tackifying resin. Adhesive compositions of this type are disclosed in further detail in US Patent Application Publication 2003/0215628 to Ma et al., which is incorporated by reference herein for this purpose.

Low Adhesion Backsize

Low adhesion backsize 103 is provided on first major side 100 of backing 2, such that when tape 1 is in a self-wound condition (e.g., as roll 20), outwardmost surface 301 of pressure-sensitive adhesive 300 is in contact with outwardmost surface 104 of low adhesion backsize 103. The composition of low adhesion backsize 103 may be chosen (e.g., in combination with the composition of pressure-sensitive adhesive 300) to provide an appropriate level of release so that roll 20 can be unwound as desired. As disclosed herein, low adhesion backsize 103 may also provide an enhanced ability to anchor paint which is deposited thereupon.

Low adhesion backsize 103 comprises a silicone-containing material comprising a silicone backbone with non-silicone (e.g., (meth)acrylate) side chains. In some embodiments, the silicone-containing material of low adhesion backsize 103 comprises a reaction product of a mercapto-functional silicone macromer having the general formula of Formula IIa, IIb, or IIc or mixtures thereof:

Formula IIa

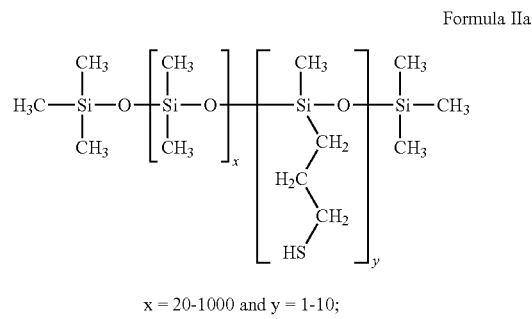

x = 20-1000 and y = 1-10;

Formula IIb

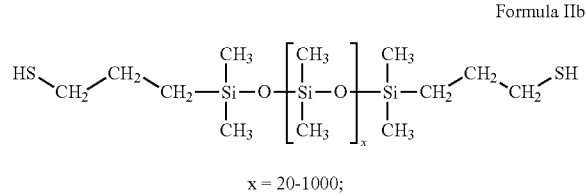

x = 20-1000;

Formula IIc

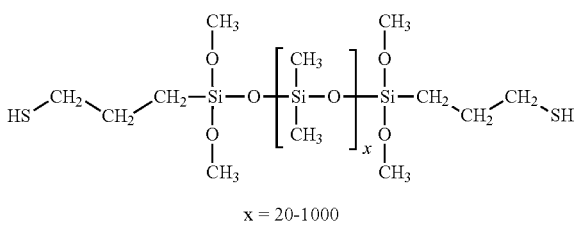

x = 20-1000

Further details of mercapto-functional silicone macromers and of the production of low adhesion backsize compositions using such macromers can be found in U.S. Pat. No. 5,032,460 to Kantner et al., which is incorporated by reference herein.

In some embodiments, low adhesion backsize 103 may comprise a discernable (e.g., measurable by conventional methods well known to those of ordinary skill) glass transition temperature ($T_g$). In some embodiments, a suitable $T_g$ may be at least −20° C., e.g. so that low adhesion backsize 103 is not tacky under most ordinary conditions of use. In further embodiments, low adhesion backsize may comprise a $T_g$ of at least about 20° C., or at least about 40° C. In additional embodiments, low adhesion backsize may comprise a $T_g$ of at most about 100° C., or at most about 70° C., or at most about 60° C. It will be appreciated that even though the polymer backbone of low adhesion backsize 103 may be comprised mostly, or essentially completely, of polysiloxane units (which comprise a very low $T_g$ of approximately −127° C.), a $T_g$ in the above range may be supplied by side chains (e.g., derived from vinyl monomers).

In various embodiments, any of the above silicone macromers may be used in combination with meth(acrylic) monomers and/or with any other vinyl monomers. Such monomers may be chosen, for example, in order to achieve any of the above-discussed glass transition temperature ranges. Low adhesion backsize 103 may be provided with a desired $T_g$ by including any suitable combination of monomer units chosen from those with a high $T_g$ (greater than 70° C.), those with a moderate $T_g$ (between 70° C. and 20° C.) and those with a low $T_g$ (less than 20° C.). Examples of the first include methyl methacrylate units ($T_g$~105° C.); examples of the second include hexadecyl acrylate units (Tg~35° C.); examples of the third include methyl acrylate units ($T_g$~9° C.). Those of ordinary skill will understand that many (meth)acrylic monomer units and other vinyl monomer units may be chosen from, for such purposes. In some embodiments, low adhesion backsize 103 may include at least about 2 wt. % of (meth)acrylic acid groups. In various embodiments, (meth)acrylic acid may be present at least at about 2 or 5 weight percent. In further embodiments, (meth)acrylic acid may be present at most about 16, 10 or 5 weight percent.

In particular embodiments, the silicone macromer of Formula IIa may be used, at approximately 15-35 weight percent of the total reactants, with the balance of the reactants including at least one high $T_g$ (meth)acrylic monomer, at least one low $T_g$ (meth)acrylic monomer, and at least one (meth)acrylic acid monomer. In specific embodiments, the low $T_g$ monomer is methyl acrylate, the high $T_g$ monomer is methyl methacrylate, and the (meth)acrylic acid monomer is methacrylic acid. In further embodiments, in such compositions the silicone macromer of Formula IIa is used at approximately 20-30 wt. %.

In still further embodiments, the amount of methacrylic acid in such compositions is between 2 and 16 wt. %, or between 5 and 10 wt. %. (These and other weight percentages of reactants listed herein are relative to the total reactants, not including any solvent or other components that may be present in the reaction mixture or the low adhesion backsize product, unless otherwise noted).

It has been found that low adhesion backsizes may surprisingly provide excellent paint anchorage (as well as providing satisfactory, or even excellent, release properties) even when they contain relatively high amounts of silicone macromer. For example, it has been found that the silicone macromer of Formula IIa, when reacted in combination with (meth)acrylic monomers as detailed in the Examples herein, provides excellent paint anchorage as well as excellent release properties. This ability of such compositions to achieve excellent paint anchorage (in particular, of water-based latex paints) is surprising in view of the well-known hydrophobicity of silicone.

In some embodiments, tape 1 comprises a low adhesion backsize 103 comprising a reaction product of any of the above mercapto-functional silicone macromers, and wherein pressure-sensitive adhesive 300 is a natural rubber-based pressure-sensitive. In particular embodiments of this type, the silicone macromer is the material of Formula IIa. Such a combination has been found to achieve a particularly advantageous combination of release (upon unwinding of tape 1 from a self-wound roll) and ability to anchor paint.

Low adhesion backsize 103 comprising silicone macromers may be made by procedures such as described e.g. in U.S. Pat. No. 5,032,460 to Kantner et al., and in U.S. Patent Application Ser. No. 61/427,932, filed Dec. 29, 2010, both of which are incorporated by reference herein. A low adhesion backsize composition (e.g., reaction product) may remain in an organic solvent solution in which it is made until it is deposited onto a substrate; however, in some cases it may be convenient to invert the low adhesion backsize into a water-borne dispersion from which it may then be deposited onto a substrate. (Strictly speaking, such a composition in solvent or water may be referred to as a low adhesion backsize precursor which may be deposited onto a substrate, with the solvent, water, etc. then being removed to form the actual low adhesion backsize as a layer). Procedures for inverting a solvent-borne low adhesion backsize (precursor) are outlined e.g. in U.S. Pat. No. 5,032,460 to Kantner et al., in the section entitled Waterborne Release Coatings.

As evidenced by the Examples presented later herein, it has been surprisingly found that low adhesion backsizes that are inverted into water and then coated therefrom may display enhanced paint anchorage over those coated out of solvent. While not wishing to be limited by theory or mechanism, it may be that the inverting process may render polar groups (e.g., acidic groups such as those provided by (meth)acrylic acid and the like) of a low adhesion backsize somehow more able to interact with e.g. water-based paints and thus may provide enhanced paint anchorage.

Methods of Making

Figure 14:
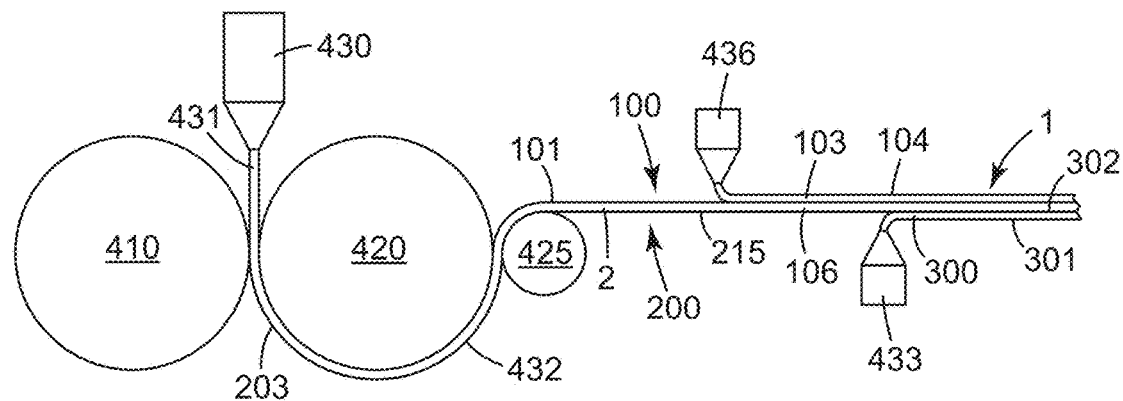
FIG. 14 is a diagrammatic view of an exemplary process for making a microstructured tape.

Shown in FIG. 14 is an exemplary apparatus and process 400 for making backing 2 and tape 1. Extruder 430 can be used to extrude molten polymeric thermoplastic extrudate 431, one major surface of which then contacts tooling roll 410, which roll bears on its surface the negative of the desired hand-tear-imparting microstructured features to be formed on second major side 200 of backing 2. The opposing major surface of extrudate 431 contacts backing roll 420, which roll may comprise a generally flat surface so as to form generally flat major surface 101 on first major side 100 of backing 2. Conveniently, the contacting may be done essentially simultaneously, e.g. by impinging molten extrudate 431 into a narrow gap (nip) in between rolls 410 and 420. Those of ordinary skill will appreciate that, rather than tooling roll 410, such tooling surfaces as may be provided by tooling belts, platens, and the like, can be used if desired. The tooling surface may be metal (e.g., in the form of a metal roll), or may comprise a softer material, e.g. a polymeric belt, or a polymeric sleeve or coating disposed upon a metal backing roll). Such a tooling surface, with the negative of the desired hand-tear-imparting features thereon, may be obtained e.g. by engraving, knurling, diamond turning, laser ablation, electroplating or electrodeposition, or the like, as will be familiar to those of skill in the art.

Backing roll 420 may comprise e.g. a polished metal surface (e.g., if it is desired that major surface 101 of major side 100 of backing 2 is to be very smooth); or, it may comprise e.g. a rubber-coated surface, in which case generally flat major surface 101 of backing 2 may comprise a matte finish. Any other arrangement (e.g., a surface coating, a sleeve, etc., may be used if desired).

Any such tooling roll and/or backing roll may be controlled (e.g., by the use of an internally circulated fluid) to any desired temperatures. It may be convenient to maintain the rolls at a temperature between about 21° C. and about 93° C., or between about 65° C. and about 79° C. If an extrusion process is used, in various embodiments the extrudable compositions (polymeric resins) may have a Melt Flow Index of between about 1 and 20, or between about 5 and 15. (If desired, rather than molten extrudate 431, a pre-existing moldable polymeric thermoplastic film can be heated and contacted with a tooling surface to mold the desired microstructured pattern on a major surface thereof.)

Molten extrudate 432 that has been contacted with a tooling surface so as to impart hand-tear pattern 203 to second major side 200 thereof can be solidified (e.g., by cooling) so as to provide backing 2 in the form of a monolithic plastic unit. It may be convenient that the molded extrudate be held in contact with a roll surface (e.g. either of the tooling roll or the backing roll), e.g. by following a path around significant portion of a roll as shown in exemplary manner in FIG. 14, to allow such solidification. If desired, a takeoff roll 425 may be provided to assist in the handling of the molded, solidified backing 2 upon its removal from a tooling roll or backing roll.

Low adhesion backsize 103 can be disposed (e.g., as a layer) on first major side 100 of backing 2, e.g. by using coater 436. Outwardmost surface 104 of low adhesion backsize 103 may be exposed (so as to be contacted with pressure-sensitive adhesive 300 when tape 1 is rolled into a self-wound roll); inwardmost surface 106 of low adhesion backsize 103 can be in direct or indirect contact with the first major surface 101 of backing 2 (e.g., any intermediate layer, treatment, etc. can be applied to surface 101 of backing 2 if desired, before the deposition of low adhesion backsize 103). The deposition of low adhesion backsize 103 can be in-line in the same process as the molding of backing 2, as in the exemplary configuration of FIG. 14. Or, it can be done off-line, in a separate process.

Coater 436 generically represents any suitable apparatus and method by which low adhesion backsize 103 may be deposited onto first major side 100 of backing 2, including e.g. solvent coating methods, water-borne coating methods, or hot melt coating methods, e.g. knife coating, roll coating, reverse roll coating, gravure coating, wire wound rod coating, slot orifice coating, slot die coating, extrusion coating, or the like. In many cases such processes may involve the deposition of an low adhesion backsize (precursor) onto first major side 100 of backing 2 and then transforming the precursor into low adhesion backsize 103 (e.g., by removal of solvent or water, by curing or crosslinking, etc.). Pressure-sensitive adhesive 300 can be disposed (e.g., as a layer) on second major side 200 of backing 2, e.g. by using coater 433. Outwardmost surface 301 of pressure-sensitive adhesive 300 may be exposed so that it can later be contacted with outwardmost surface 104 of low adhesion backsize 103 (e.g., when tape 1 is rolled up into a self-wound roll); inwardmost surface 302 can be in direct or indirect contact with second major surface 215 of backing 2 (e.g., any intermediate layer, treatment, etc. can be applied to the second major surface of backing 2 if desired, before the deposition of pressure-sensitive adhesive 300). The deposition of pressure-sensitive adhesive 300 can be in-line in the same process as the molding of backing 2 and/or deposition of low adhesion backsize 103, as in the exemplary configuration of FIG. 14. Or, it can be done off-line, in a separate process.

Coater 433 generically represents any suitable apparatus and method by which pressure-sensitive adhesive 300 can be deposited onto second major side 200 of backing 2, including e.g. solvent coating methods, water-borne coating methods, or hot melt coating methods, e.g. knife coating, roll coating, reverse roll coating, gravure coating, wire wound rod coating, slot orifice coating, slot die coating, extrusion coating, or the like. In many cases such processes may involve the deposition of a pressure-sensitive adhesive (precursor) onto second major side 200 of backing 2 and then transforming the precursor into pressure-sensitive adhesive 300 (e.g., by removal of solvent or water, by curing or crosslinking, etc.). However provided, it may be desirable to dispose pressure-sensitive adhesive 300 onto second major side 200 so that the adhesive is not only in intimate contact with, and adhesively bonded to, second major surface 215 of backing 2, but so that the adhesive also penetrates into the recesses that form lines of weakness 210, and is in intimate contact with, and adhesively bonded to, the surfaces (e.g., walls, floor, etc.) of the recesses. Furthermore, it may be desirable to provide pressure-sensitive adhesive 300 at a thickness, relative to the depth of the recesses, such that the outwardmost surface 301 of adhesive 300 is generally flat even in the areas of adhesive 300 overlying the recesses of second major side 200 of backing 2 (e.g., rather than exhibiting depressions in those areas). In various embodiments, the thickness of pressure-sensitive adhesive 300 may be at least about 20 microns, at least about 30 microns, or at least about 40 microns. In further embodiments, the thickness of pressure-sensitive adhesive 300 may be at most about 100 microns, at most about 80 microns, or at most about 60 microns.

First major surface 101 of first major side 100 of backing 2 may be treated so as to enhance the ability of low adhesion backsize 103 to be securely attached thereto. Such treatments may include e.g. corona treatment, plasma treatment, flame treatment, or the like; or, deposition (e.g., coating) of a primer, tie layer, or the like. (It has been found that corona treatment alone (without subsequent coating of an LAB) can significantly enhance the paint anchorage ability of the surface of e.g. a polyolefinic tape backing, due to the increase in surface energy imparted by the corona treatment. However, this has been found to come at the cost of unacceptably high release values caused by such increased surface energy.) Second major surface 215 (and recesses thereof) of second major side 200 may be likewise corona-treated, coated with a primer, etc., to enhance the ability of pressure-sensitive adhesive 300 to be securely attached thereto. Surfaces 101 and 215 may receive the same treatment, or different treatment, as desired.

In some embodiments, first major side 100 of backing 2 of tape 1 may comprise a microstructured paint-retention pattern so as to enhance the retention of liquid paint by the tape. Such microstructured paint-retention patterns are described in further detail in U.S. patent application Ser. No. 13/042,536, filed Mar. 8, 2011, incorporated by reference herein for this purpose. In such cases, low adhesion backsize 103 may be provided at least upon the outwardmost surfaces of partitions that comprise the microstructured paint-retention pattern.

Tape

Whether made by a process of the general type shown in FIG. 14 or by any other suitable process, tape 1 may be conveniently provided in the form of a roll 20 as shown in exemplary manner in FIG. 2. Tape 1, and roll 20 thereof, do not include any kind of release liner (e.g., a paper or plastic film liner, that is separate from backing 2 and that bears a release surface, whether supplied by the film liner itself or by a coating thereupon). That is, roll 20 is a self-wound roll that is wound directly upon itself with outwardmost surface 301 of pressure-sensitive adhesive 300 in releasable contact with outwardmost surface 104 of low adhesion backsize 103. By releasable contact is meant that pressure-sensitive adhesive 300 is adhered to the outwardmost surface 104 of low adhesion backsize 103 sufficiently to provide roll 20 with adequate mechanical integrity to acceptably maintain the form of a roll (that is, so that the roll does not unacceptably unroll from its self-wound condition too easily), but so that the adhesive force between pressure-sensitive adhesive 300 and outwardmost surface 104 of low adhesion backsize 103 is low enough that adhesive 300 can be released from low adhesion backsize 103 without unacceptable force being necessary and without unacceptably damaging the adhesive or debonding the adhesive from second major side 200 of backing 2 or otherwise unacceptably damaging or affecting tape 1. The release properties of a given tape 1 with a low adhesion backsize and a pressure-sensitive adhesive on opposing sides thereof may be gauged by way of the force required to unwind tape 1 from its self-wound condition, as measured e.g. by the procedure described in the Examples herein. As measured in this manner, in various embodiments tape 1 may comprise an unwind force of at least 2, 4, or 9 ounces of force per inch width of tape (0.22, 0.44, or 0.99 N/cm width of tape). In further embodiments, tape 1 may comprise an unwind force of at most 25, 21, or 16 ounces of force per inch width of tape (2.75, 2.31, or 1.76 N/cm width of tape).

In order to use tape 1, a length of the tape may be removed from an elongate length, e.g. a roll 20, of the tape. This may be performed by hand-tearing the tape across its transverse width, at a desired location, although scissors, a knife, or any other suitable cutting implement may be used if convenient. The hand-tearing may be performed by grasping, with each hand, portions of the tape that longitudinally bracket the desired tear location, and moving one portion of the tape in a first direction and the other portion in a generally opposite direction so as to apply shear force at the desired tear location to initiate and propagate a tear at least generally transversely across the width of the tape. Once the length of tape is thus obtained, it can be applied and adhered to a desired portion of a surface to be masked. Alternatively, a terminal portion of the tape may, while still attached to roll 20, be applied and adhered to a desired portion of a surface and then a remaining portion of the elongate length of the tape (e.g., roll 20 itself) may be manipulated (e.g., twisted or translated) so that the non-adhered portion of the tape is at least generally transversely torn in a location e.g. near the closest point at which the tape is adhered to the surface. Both of these methods are well known to those of skill in the art. If desired, tape 1 may be used in conjunction with a masking film, and may be conveniently applied (e.g., along with such a masking film) to a surface by use of a masking tool, e.g. the product available from 3M Company of St. Paul, Minn., under the trade designation 3M HAND-MASKER DISPENSER.

Tape 1 having been applied to a desired portion of a surface, adjacent portions of surfaces can then be painted as desired (the term paint is used broadly herein and encompasses any coating, primer, varnish, lacquer, and the like). At any suitable time (e.g., after the paint has dried to a desired extent), tape 1 can then be removed from the surface.

In some embodiments, the composition of low adhesion backsize 103 can be chosen to enhance the ability of tape 1 to retain and anchor liquid paint, such as might be applied with a sprayer, brush, roller, etc. Such paint may be e.g. latex or oil-based. Such paints may be distinguished from e.g. inks and the like. Inks are usually deposited in small volumes, and the main concern is typically preserving the quality of the formed image (e.g., minimizing the degree to which a deposited small volume of ink may migrate and/or diffuse in such manner as to blur the edges of the image, or may bead up and be smeared over the surface of the substrate so as to blur the edges of the image, etc.). In contrast, the main concern with the use of masking tapes with paints is the ability of the masking tape to retain and anchor gross quantities of paint. The use of certain low adhesion backsize compositions has been found to enhance the ability of tape 1 to anchor gross quantities of paint, including high viscosity (e.g., >100 cps at 21 degrees C.) latex paints. That is, it has been found that certain low adhesion backsize compositions may provide paint which has been dried thereupon with an enhanced ability to resist flaking off, as evidenced by the Paint Anchorage Ratings disclosed in the Examples herein.

Figure 15:
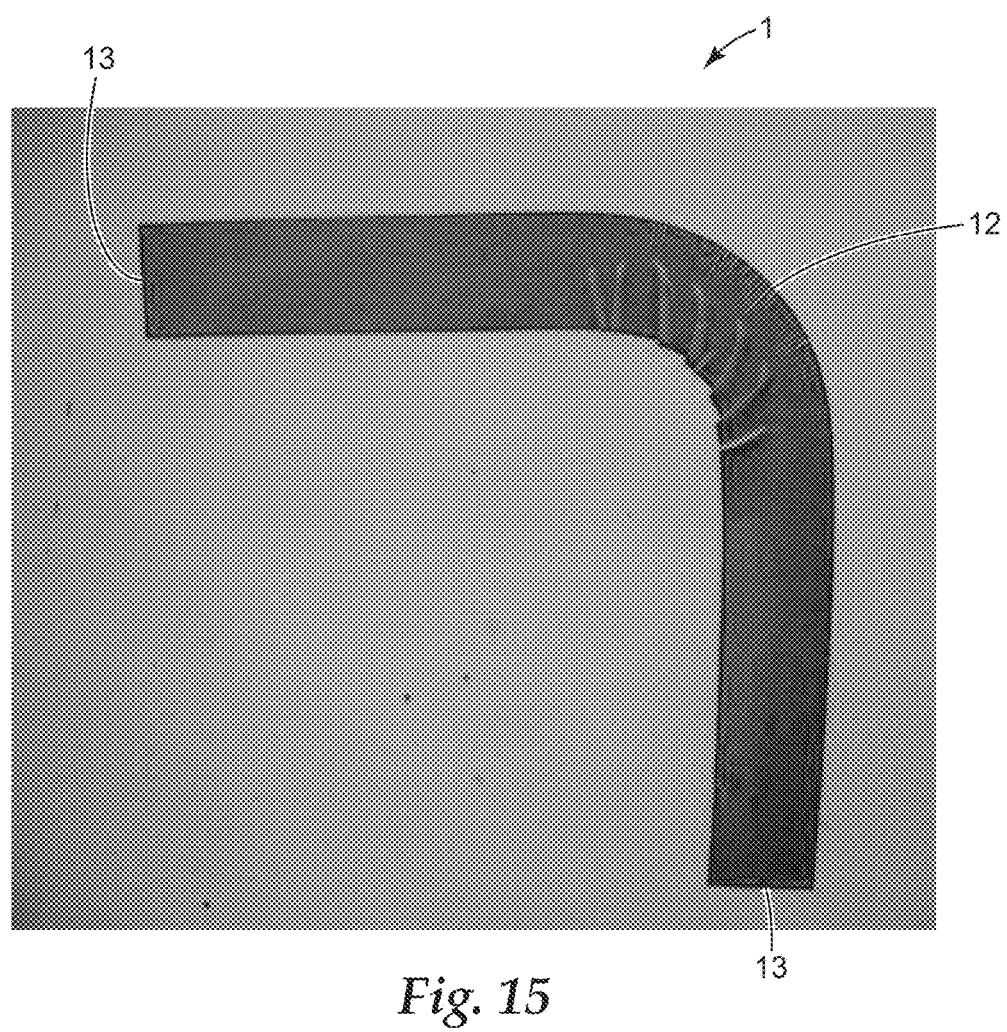
FIG. 15 is a digital photograph showing an exemplary microstructured tape that has been transversely curved into an arcuate shape.

Tape 1 as disclosed herein comprises an additional advantage in that it can be transversely curved (which might be done by some apparatus or device, but may be most likely to be done manually by a user of the tape). In this context, to transversely curve an elongate length of tape 1 means to form it into a continuous curved shape that lies in a generally flat plane (e.g., as shown in the digital image of an exemplary transversely curved tape 1 in FIG. 15). Such an ability may allow a single elongate length of tape 1 to be transversely curved to follow an arcuate shape or edge (e.g., an edge of an oval or round window) that conventionally might require numerous short, linear lengths of tape to be used in combination, and/or might require lengths of tape to be manually folded, to match. Those of ordinary skill will appreciate that the ability of tape 1 to be transversely curved means that at least some areas of backing 2, e.g. those close to one minor edge of backing 2 (e.g., minor edge 12 of FIG. 15), must be able to stretch at least somewhat without tearing through the thickness of the backing, upon application of stretching force to those areas of backing 2. (Evidence of such stretching without through-tearing is visible near edge 12 of FIG. 15). It will be further appreciated that these same areas of backing 2 must nevertheless be able to be transversely torn upon application of shear force to backing 2 as described above, in order that the hand-tear property of tape 1 is achieved. Such abilities might be expected to be in conflict with each other. However, it has nevertheless been found that hand-tearable tape 1 can be transversely curved so as to stretch outermost areas of the curved tape up to a local elongation of about 20%, 40%, or even 80%. This ability of tape 1 and backing 2 thereof to be easily transversely hand-torn, and also to be successfully transversely curved, represent unexpected results. Such ability is evidenced by the tape sample shown in FIG. 15 which has been both transversely curved (in the area near edge 12 of the curved portion of the tape) and transversely hand-torn (at hand-torn edges 13).

It has further been discovered that tape backing 2 and low adhesion backsize 103 thereof can still satisfactorily anchor paint thereon even after the tape/backing has been stretched to a significant extent (e.g., up to an elongation of about 50%). It might be expected that such extensive stretching would disrupt and/or rupture the low adhesion backsize layer (e.g., causing it to fracture into islands and/or to become disattached from the surface of the tape backing), which might expose portions of the polymeric material of the backing. Particularly in the case of polyolefinic tape backings, such phenomena might be expected to adversely impact the paint anchorage. Nevertheless, tape 1 as disclosed herein has been found to still provide excellent paint anchorage after being stretched to about 50%, and may provide excellent paint anchorage even up to an elongation of about 80% or more. This surprising finding renders tape 1 uniquely suited for the masking of non-linear areas and borders.

Thus in summary, by "transversely curvable" is meant that a tape can be curved into a continuous curved shape that lies in a generally flat plane, without through-tearing of the stretched area of the curved portion of the tape. In at least some embodiments, a transversely curvable tape can also achieve a Paint Anchorage Rating of excellent according to the test procedures outlined herein, even after having been stretched to an elongation of about 50%.

Tape 1 as disclosed herein comprises an additional advantage of being resistant to slivering, e.g. in comparison to conventional paper-based masking tapes. Additionally, tape 1 as disclosed herein may comprise yet another advantage in being less susceptible to undesirable effects of humidity, e.g. in comparison to conventional paper-based masking tapes. Still further additionally, tape 1 as disclosed herein may comprise an enhanced ability to conform to and bond to rough or uneven surfaces, and may provide good paint lines even upon such surfaces.

Although discussed herein primarily in the context of being used for masking applications e.g. in connection with painting, those of ordinary skill will appreciate that tape 1 as disclosed herein may find use in other applications as well. It will however be evident to those ordinary skill that, in any application, tape 1 as it will be used by an end user will comprise backing 2 with pressure-sensitive adhesive 300 thereupon, therefore backing 2 is different from, and cannot be equated with, any kind of liner, release liner, protective film or the like, that is removed from contact with an adhesive layer and discarded before the actual end use of the adhesive.

Further details of hand-tearable masking tapes and of low adhesion backsizes that may be used therewith, are found in U.S. Provisional Patent Application Ser. No. 61/512,225, HAND-TEARABLE MASKING TAPE WITH LOW ADHESION BACKSIZE, filed evendate herewith, which is incorporated by reference in its entirety herein.

LIST OF EXEMPLARY EMBODIMENTS

Embodiment 1

A hand-tearable masking tape, comprising: a polyolefinic backing comprising a longitudinal axis and a transverse width and axis, and comprising a first major side and an oppositely-facing second major side, wherein a pressure-sensitive adhesive is disposed on the second major side of the backing and wherein the second major side of the backing comprises a microstructured hand-tear pattern comprising a multiplicity of lines of weakness at least some of which comprise a long axis that is oriented at least generally transversely to the backing; and wherein a low adhesion backsize is disposed on the first major side of the backing, the low adhesion backsize comprising the reaction product, with one or more (meth)acrylic monomers and/or oligomers and/or vinyl monomers and/or oligomers, of a mercapto-functional silicone macromer having the general formula of Formula IIa, IIb, or IIc:

Formula IIa

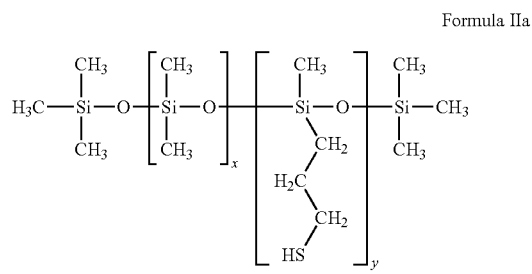

x = 20-1000 and y = 1-10;

Formula IIb

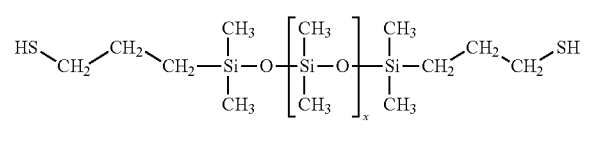

x = 20-1000;

Formula IIc

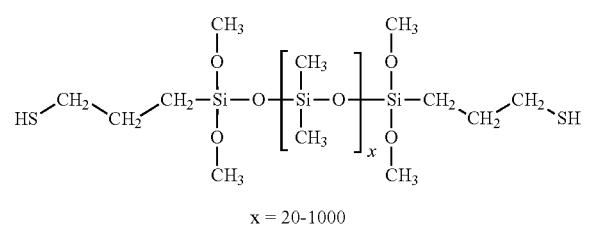

x = 20-1000 or, combinations or mixtures or any of the above silicone macromers.

Embodiment 2

The tape of embodiment 1 wherein the mercapto-functional silicone macromer is the silicone macromer of Formula IIa.

Embodiment 3

The tape of embodiment 2 wherein the reaction product comprises from about 15 to about 40 wt. % of the silicone macromer.

Embodiment 4

The tape of embodiment 2 wherein the reaction product comprises from about 20 to about 30 wt. % of the silicone macromer.

Embodiment 5

The tape of any of embodiments 1-4 wherein the low adhesion backsize comprises the reaction product of the mercapto-functional silicone macromer(s) with (meth)acrylic monomers and/or oligomers.

Embodiment 6

The tape of embodiment 5 wherein the reaction product comprises (meth)acrylic monomer units with a $T_g$ of less than 20° C., (meth)acrylic monomer units with a $T_g$ of greater than 70° C., and (meth)acrylic acid monomer units.

Embodiment 7

The tape of embodiment 5 wherein the reaction product comprises methyl methacrylate monomer units, methyl acrylate monomer units, and methacrylic acid monomer units.

Embodiment 8

The tape of any of embodiments 1-7 wherein the low adhesion backsize comprises a $T_g$ in the range of from about 20° C. to about 60° C.

Embodiment 9

The tape of any of embodiments 1-8 wherein the low adhesion backsize comprises a water-borne coating.

Embodiment 10

The tape of any of embodiments 1-9 wherein the pressure-sensitive adhesive is a natural-rubber-based pressure-sensitive adhesive.

Embodiment 11

The tape of any of embodiments 1-10 wherein the polyolefinic material is a polyethylenic material.

Embodiment 12

The tape of embodiment 11 wherein the polyethylenic material is a blend of low density polyethylene and high density polyethylene.

Embodiment 13

The tape of embodiment 12 wherein the blend is at a weight ratio of from about 20:80 to about 40:60 of low density polyethylene to high density polyethylene.

Embodiment 14

The tape of any of embodiments 1-13 wherein the tape comprises an elongate length in the form of a self-wound roll in which a major surface of the pressure-sensitive adhesive is in releasable contact with a major surface of the low adhesion backsize.

Embodiment 15

The tape of any of embodiments 1-14 wherein the tape is transversely curvable.

Embodiment 16

The tape of embodiment 16 wherein the transversely curvable tape, after having been stretched to an elongation of about 50%, exhibits a Paint Anchorage Rating of excellent.

Embodiment 17

The tape of any of embodiments 1-16 wherein the tape comprises an unwind force of between about 9 oz/inch and about 16 oz/inch.

Embodiment 18

The tape of any of embodiments 1-17 wherein at least some of the lines of weakness are continuous lines of weakness each comprising a continuous groove that extends across the entire transverse width of the second side of the backing.

Embodiment 19

The tape of embodiment 18 wherein at least some of the continuous lines of weakness comprise a long axis that is oriented within plus or minus 5 degrees of the transverse axis of the backing.

Embodiment 20

The tape of any of embodiments 1-17 wherein at least some of the lines of weakness are discontinuous lines of weakness, each discontinuous line of weakness being collectively defined by a multiplicity of recesses in a second major surface of the second major side of the backing.

Embodiment 21

A method of painting a first surface portion while masking a second surface portion so that it is not painted, the method comprising adhesively attaching a length of the hand-tearable masking tape of any of embodiments 1-20 to the second surface portion and then applying liquid paint to at least the first surface portion.

Embodiment 22

The method of embodiment 21 wherein the length of hand-tearable plastic tape is hand-torn from a roll of hand-tearable plastic tape prior to being adhesively attached to the second surface portion.

Embodiment 23

The method of any of embodiments 21-22 comprising the further step of, after applying the liquid paint to at least the first surface portion, removing the length of tape from the second surface portion.

Embodiment 24

The method of any of embodiments 21-23 wherein the method comprises transversely curving at least a portion of the length of hand-tearable plastic tape to match an arcuate shape of the second surface portion and adhesively attaching the transversely curved length of tape to the arcuate-shaped second surface portion.

Embodiment 25

A method of making a hand-tearable plastic tape comprising a backing with a first major side and a second, oppositely-facing major side with a microstructured hand-tear pattern, the method comprising: contacting a second major surface of a molten polymeric extrudate with a tooling surface that comprises a negative of the microstructured hand-tear pattern, so that the second major surface of the extrudate is molded against the tooling surface so as to form a backing with a microstructured hand-tear pattern on the second major side of the backing; and, disposing a pressure-sensitive adhesive on the second major side of the backing and disposing a low adhesion backside on the first major side of the backing, wherein the low adhesion backsize comprises the reaction product, with one or more (meth)acrylic monomers and/or oligomers and/or vinyl monomers and/or oligomers, of a mercapto-functional silicone macromer having the general formula of Formula IIa, IIb, or IIc.

Embodiment 26

A method of making a hand-tearable plastic tape of any of embodiments 1-20 by the method of embodiment 25.

EXAMPLES

Production of Tape Backings

Apparatus

Extrusion and molding of tape backings were performed using a process line of the general type shown in FIG. 14. A metal tooling roll was obtained with an approximately 12 inch (30.5 cm) diameter and an approximately 16 inch (40.6 cm) total face width. On the patterned portion of the roll face were provided (by diamond turning) a multiplicity of parallel protruding ridges that each ran transversely across the face of the roll, and that were spaced around the circumference of the roll. Each ridge comprised a peak that was 33 microns above the plano surface of the second tooling roll. Each ridge comprised flat sidewalls that were at an angle of approximately 130 degrees relative to each other. The base of each ridge (adjacent the plano surface of the tooling roll) was approximately 140 microns wide. The ridges were circumferentially spaced around the second tooling roll at a center-to-center distance of approximately 940 microns. Each ridge comprised a set of secondary notches each comprising two flat surfaces intersecting to form a linear valley running transversely across a portion of the width of the ridge (i.e., oriented circumferentially around the face of the second tooling roll). Each linear valley was approximately 24 microns below the ridge peak (and thus approximately 9 microns above the plano surface of the tooling roll). The two flat surfaces of each secondary notch were at an angle of approximately 124 degrees relative to each other. The secondary notches were spaced at intervals of approximately 340 microns along each ridge.

A backing roll was obtained with an approximately 12 inch (30.5 cm) diameter and with a rubber coating having a durometer of approximately 70-90 Shore A.

Materials and Process/Representative Tape Backing

An extrudable composition was obtained comprising approximately 30 wt. % low density polyethylene (LDPE) with a density of 0.918 g/cm3 and a Melt Flow Index of 12, obtained from Dow Plastics under the trade designation 4012, and approximately 70 wt. % high density polyethylene (HDPE) with a density of 0.965 g/cm3 and a Melt Flow Index of 8.3, obtained from Dow Plastics under the trade designation 8007. Approximately 3 wt. % of a blue colorant concentrate (with the polymeric carrier resin of the concentrate not being recorded but believed to be a polyethylene material) was added based on the total weight of the LDPE and HDPE. The materials were obtained in the form of dry pellets and were dry blended and fed into a 2.5 inch (6.4 cm) diameter single screw extruder and extruded through a 12 inch (30.5 cm) wide cast film die containing a nominal 20 mil (508 μm) gap (subject to adjustment as necessary to optimize the cross-web caliper of the produced web). The die temperature was set at approximately 218° C. and the molten extrudate was extruded at a melt pressure of approximately 1000 psi (6900 kPa). The extrudate was extruded and processed at a linespeed of approximately 15.2 meters per minute.

The above-described tooling roll and backing roll were brought together to form a nip under pressure in the range of approximately 100 pli (pounds per linear inch width; 175 N per linear cm width). Both rolls (which comprised double-spiral shell construction) were temperature-controlled via internally circulated water to maintain a nominal temperature of approximately 66° C. The molten extrudate passed through the nip between the rolls so that, on one side of the molten extrudate stream, the molten extrudate flowed over and around the protruding ridges of the second tooling roll to form (after solidification) grooves that were oriented transversely across the width of the thus-formed backing. The molten extrudate flowed into the secondary notches in the ridges so as to form ridged bridging structures of the general type shown in FIGS. 8 and 9 herein. The extrudate was maintained in contact with the tooling roll for a wrap angle of approximately 135 degrees, at which point the solidified backing was detached from the tooling roll and passed over a takeoff roll. The solidified backing could then be wrapped into a roll. The total thickness of the thus-formed Representative Tape Backing was typically in the range of 90-95 microns. The first major side of the backing, which had been in contact with the rubber surface of the backing roll, exhibited a generally flat matte finish surface. The second major side of the backing comprised a plano surface comprising continuous lines of weakness (recessed grooves) which were oriented approximately transversely across the width of the backing and were approximately 33 microns deep and approximately 140 microns wide (at the plano surface of the second side of the backing).

Variations

Numerous variations of the above Representative Tape Backing were made, over a wide range of process line conditions, resin compositions, and the like. In various experiments, the LDPE:HDPE ratio was varied over the range of approximately 10:90 to 90:10.

Production of Low Adhesion Backsizes
The following materials were obtained:

TABLE 1

| Abbreviation | Description | Source |
| --- | --- | --- |
| KF-2001 | Mercapto-functional silicone macromer ($M_W$ 1000-15,000) | Shin-Etsu Chemical Co, Tokyo, Japan |
| MA | Methyl acrylate | Arkema Inc., Philadelphia, PA |
| MMA | Methyl Methacrylate | Lucite International, Japan |
| MAA | Methacrylic acid | Dow Chemical, Midland, MI |
| VAZO 64 | 2.2'-Azo bis (2-isobutryonitrile) | DuPont, Wilmington, DE |

Representative Silicone-Containing Low Adhesion Backsize

Representative silicone low adhesion backsize composition LAB-Si-R was made, of the composition shown in Table 2, using procedures generally similar manner those described in the Examples of U.S. Provisional Patent Application Ser. No. 61/427,932, filed Dec. 29, 2010. In Table 2, the reactants are listed in weight percent of total reactants; the reaction was run in methyl ethyl ketone and was initiated with VAZO 64 initiator, amounts not shown. (Some batches were formulated in larger volumes, using conventional mixing and processing apparatus.)

TABLE 2

| Sample | KF-2001 | MA | MMA | MAA |
| --- | --- | --- | --- | --- |
| LAB-Si-R | 25 | 50 | 20 | 5 |

The composition, as made as a solution in methyl ethyl ketone, was then inverted by addition to an ammoniacal aqueous solution, using procedures generally similar to those disclosed in U.S. Pat. No. 5,032,460, to produce an approximately 15% solids dispersion in water.

Variations

Other silicone-macromer-based low adhesion backsize formulations were made in similar manner as the above Representative Silicone-Containing LAB, of various compositions. These compositions are listed in Table 3 (along with LAB-Si-R); also listed are the estimated glass transition temperatures of the acrylic side-chain portions of the reaction products:

TABLE 3

| Sample | KF-2001 | MA | MMA | MAA | Form | $T_g$ (° C.) |
| --- | --- | --- | --- | --- | --- | --- |
| LAB-Si-R | 25 | 50 | 20 | 5 | 15% in water | 45 |
| LAB-Si-2 | 30 | 30 | 35 | 5 | 5% in MEK | 60 |
| LAB-Si-3 | 30 | 25 | 43 | 2 | 5% in MEK | 70 |
| LAB-Si-4 | 27.3 | 18.2 | 45.4 | 9.1 | 5% in MEK | 90 |
| LAB-Si-5 | 27.3 | 18.2 | 45.4 | 9.1 | 14% in water | 90 |

Coating of Low Adhesion Backsizes

Low adhesion backsize compositions were coated onto the first major side (the matte-finish side) of Representative Tape Backing samples described above. The first major side of the film was air corona treated using conventional methods and apparatus, to a dyne level of about 45 dyne/cm, prior to coating of the low adhesion backsize composition. Coating of the compositions was performed by gravure coating, typically at a line speed of approximately 7.6 meters per minute. The coated composition was dried at a temperature of approximately 54° C. to remove the solvent (or water, in some cases) to provide the low adhesion backsize coating. The tape backing with the low adhesion backsize on the first major side thereof could then be wound until ready for further processing or testing.

Coating of Representative Pressure-Sensitive-Adhesive

A natural rubber-based pressure-sensitive adhesive composition was formulated of the general type described in US Patent Application Publication 2003/0215628, comprising an approximately equal weight ratio of natural rubber elastomer and radial block copolymer elastomer, and comprising approximately 80 parts of tackifying resin per 100 parts of total elastomer. The composition also comprised approximately 85 parts of calcium carbonate filler per 100 parts of total elastomer, as well as appropriate amounts of antioxidants, stabilizers, and the like as are customary in such formulations.

The second major surface of the tape backing was air corona treated, using conventional methods and apparatus, to a dyne level of about 45 dyne/cm; and, a polychloroprene primer was coated onto the corona treated second major surface, prior to coating of the pressure-sensitive adhesive composition thereupon. (It will also be appreciated that an above-described low adhesion backsize was coated onto the first major surface of the tape backing before the coating of the adhesive onto the second major surface of the tape backing, so that the resulting tape could be self-wound). The pressure-sensitive composition was coated onto the second major side (the side bearing the microstructured hand tear pattern) of the Representative Tape Backing using a hot-melt die coating apparatus. The adhesive was typically coated at a (dry) coating weight of 38-50 grams per square meter. At such thicknesses it was typically found that the coated adhesive composition filled the grooves (of the hand tear pattern) in the tape backing, in such manner that little or no corresponding depression in the outwardmost surface of the pressure-sensitive adhesive was present in the areas overlying the grooves.

The hot-melt-coated pressure-sensitive adhesive composition was then e-beam cured using conventional e-beam apparatus and methods. The tape with the thus-formed pressure-sensitive adhesive thereupon could then be self-wound into a roll.

Test Procedures

Test for Unwind Force of Rolls of Tape

The release property of a given low adhesion backsize (in combination with a pressure-sensitive adhesive) was evaluated by attaching a tape roll to a spool fixture of a slip/peel tester (Model 3M90, IMASS Inc., Hingham, Mass.) and measuring the force required to unwind the tape from the tape roll, at a peel rate of 90 inches/minute (229 cm/min) at an approximately 90 degree angle with respect to the tape roll. The average force over a run time of approximately 5 seconds was measured, and was reported as ounces of force per inch (width) of tape (0.11 N per cm width of tape). Such unwind measurements were usually performed after approximately 11 days of aging at approximately 21° C. and approximately 50% relative humidity, although testing was performed after other exposures as well.

Test for Dried Paint Anchorage Capability

Tests of dried paint anchorage were performed on low adhesion backsizes on tape backings (typically without a pressure-sensitive adhesive being present on the opposite side of the tape backing). A battery of eleven commercially available paints, including mostly latex (water-based) paints but also including a few oil-based paints, were used. (An abbreviated version of the test, suitable e.g. for preliminary screening, may be performed with a commercially available latex acrylic paint, e.g. the product available from Sherwin Williams under the trade designation. DURATION Exterior Acrylic Latex.)

Each of the various liquid paints was brushed sparingly onto the first (LAB-containing) side of a tape backing sample and allowed to dry for at least approximately 48 hours at ambient conditions. After drying, a 4.5 kg soft-surfaced roller was used to adhere an aggressive masking tape (available from 3M Company under the trade designation 2060) onto the top of the painted samples. (The 2060 masking tape used a tackified natural rubber adhesive with the following peel values: stainless steel—42 oz/inch; glass—43 oz/inch; HDPE—29 oz/inch; the test may be performed with any such adhesive with similar peel values).

The 2060 masking tape was allowed to remain attached to the dried paint for a dwell time of at least approximately 5 minutes. The 2060 masking tape was then manually peeled from the film sample (at a peel angle in the range of approximately 135 degrees) and the amount of dried paint that remained anchored on the low adhesion backsize of the tape backing (as opposed to being peeled off by the 2060 masking tape) was visually inspected. Based on its aggregate performance against the battery of paints, the paint-anchorage performance of a low adhesion backsize was assigned one of three values in a Paint Anchorage Rating: Excellent, Acceptable, and Poor.

In some cases, a more stringent version of the test was performed, in which the tape backing with dried paint thereupon was extensively manually crumpled into a small ball and was then flattened back out as much as possible and the 2060 masking tape applied to the painted side thereof and the test run as described above. In some cases, at least a portion of a tape backing was stretched to an elongation of at least about 40%, prior to the liquid paint being applied thereto.

In some cases, tape backings with low adhesion backsizes thereon were evaluated for paint anchorage after having been (manually) stretched to an elongation of approximately 50%. (Although such testing may reveal e.g. how tape backing areas may perform upon being stretched in the process of transversely curving the tape, for convenience the samples may be stretched linearly, with paint applied thereafter and the test being run as described above.)

Results

Unwind Force

Representative Tape Samples that comprised the representative tape backing as described herein (comprising a 30:70 weight ratio of LDPE:HDPE), with the representative low adhesion backsize coating (LAB-Si-R) on the first major side thereof and with the representative (natural rubber based) pressure-sensitive adhesive on the second major side (bearing the hand-tear pattern) thereof, were tested for release properties according to the above-described unwind force test. The unwind force was typically found to range from approximately 5 oz/inch (0.55 N/cm) to 13 oz/inch (1.43 N/cm). (The differences appeared to be primarily associated with an increase in unwind force with longer times, e.g. several days, and higher temperature, of storage of the self-wound roll before testing, as is typical behavior of many pressure-sensitive adhesives). Tape rolls bearing low adhesion backsize samples LAB-Si-2, LAB-Si-3, LAB-Si-4, and LAB-Si-5 were found to exhibit generally similar results, with the samples with the highest amount of methacrylic acid (LAB-Si-4 and LAB-Si-5) typically exhibiting somewhat higher, but still quite acceptable, unwind forces.

Paint Anchorage

Representative Tape Backing samples (comprising a 30:70 weight ratio of LDPE:HDPE), with the representative low adhesion backsize coating (LAB-Si-R) on the first major surface (but typically without any pressure-sensitive adhesive being present on the second major surface) were tested for paint anchorage as described above. The paint anchorage performance was rated Excellent (with excellent anchorage being observed with essentially all of the paints against which the tape samples were tested). The more stringent version of the paint anchorage test, in which the tape backing was crumpled and then flattened as described above, was also run, again with excellent results. Other Representative Tape Samples were linearly stretched to an elongation of approximately 50%, and were then tested for paint anchorage, as described above. A Paint Anchorage Rating of Excellent was again achieved, which was particularly surprising in view of the degree to which the tape had been stretched.

Tape backing samples with low adhesion backsize coating LAB-Si-5 also achieved an excellent Paint Anchorage Rating, while those with coatings LAB-Si-2, LAB-Si-3, and LAB-Si-4 displayed acceptable paint anchorage ratings. It is noted that LAB-Si-R and LAB-Si-5 are both water-borne low adhesion backsizes, and is noted in particular that LAB-Si-5 and LAB-Si-4 differ only in that Si-5 is water-borne whereas Si-4 is solvent-borne.

Evaluation of Ability to Handle, Hand-Tear, and Transversely Curve Tape

Representative Tape Samples as described above, with a low adhesion backsize on the first side and a hand-tear pattern and a pressure-sensitive adhesive on the second side were evaluated for their overall handleability. Extensive research revealed the most desirable handling properties to comprise an aggregate of the ability of the tape to be transversely hand-torn, the ability of the tape to be transversely curved (with commensurate stretching of the outermost portion of the tape), and the ability of the tape to resist cupping (bowing in the cross-web direction) when a relatively long length of tape is handled, all as discussed earlier herein. It was found that these goals are often at odds with each other.

When all of these properties were combined into an overall measure of Handleability and an overall ranking of tape performance (on a scale of Exceptional, Fair, and Marginal) was obtained, the following effect of the composition of the tape backing was unexpectedly revealed:

TABLE 4

| LDPE:HDPE Weight Ratio | Handleability |
| --- | --- |
| 0:100 | Marginal |
| 10:90 | Fair |
| 20:80 | Exceptional |
| 30:70 | Exceptional |
| 40:60 | Exceptional |
| 50:50 | Fair |
| 60:40 | Fair |
| 80:20 | Marginal |
| 100:0 | Marginal |

It is emphasized that Table 4 is provided to highlight the exceptional performance of the 20:80-40:60 LDPE:HDPE tape backing compositions, and does not imply that other compositions, even those rated marginal, must necessarily be outside the scope of the invention as claimed herein. Those of ordinary skill will appreciate that such compositions may still find use in certain applications or circumstances.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control.

What is claimed is:

1. A hand-tearable masking tape, comprising:
a monolithic polyolefinic backing having a thickness and comprising a longitudinal length and a longitudinal axis and a transverse width and a transverse axis, and comprising a first major side and an oppositely-facing second major side, wherein a pressure-sensitive adhesive that includes an elastomeric polymer that is a reaction product of (meth)acrylic monomers and/or oligomers is disposed on the second major side of the backing and wherein the second major side of the backing comprises a microstructured hand-tear pattern consisting of a multiplicity of lines of weakness at least some of which comprise a long axis that is oriented at least generally transversely to the longitudinal axis of the backing, and wherein the lines of weakness are predetermined, molded, open-ended recesses that do not completely penetrate through the thickness of the backing from the second major side of the backing to the first major side of the backing, wherein at least some of the open-ended recesses are in the form of grooves that extend across the transverse width of the backing, wherein at least some of the grooves comprise bridging structures that are spaced periodically down the length of the grooves, and wherein at least some of the bridging structures comprise two major sloping surfaces that meet at a topmost ridge that is oriented at least substantially laterally across a width of the groove;

and wherein a low adhesion backsize is disposed on the first major side of the backing, the low adhesion backsize consisting of a reaction product that is formed by reacting one or more (meth)acrylic monomers and/or oligomers and/or vinyl monomers and/or oligomers, with a mercapto-functional silicone macromer having the general Formula IIa, IIb, or IIc:

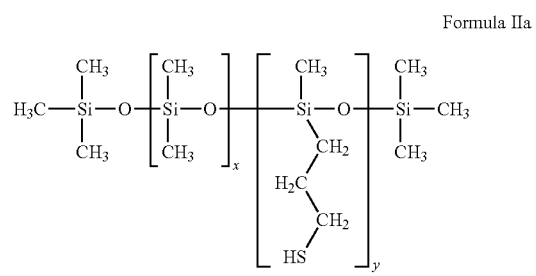

Formula IIa x = 20-1000 and y = 1-10;

-continued

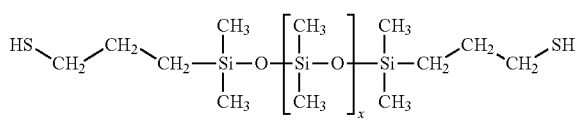

Formula IIb x = 20-1000;

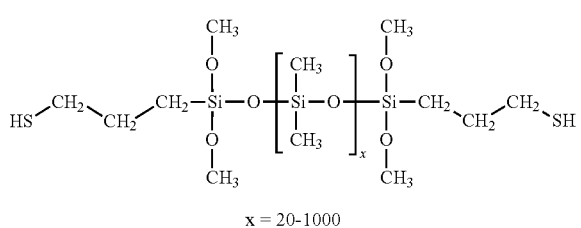

Formula IIc x = 20-1000 or, combinations or mixtures of any of the above silicone macromers.

2. The tape of claim 1 wherein the mercapto-functional silicone macromer is the silicone macromer of Formula IIa:

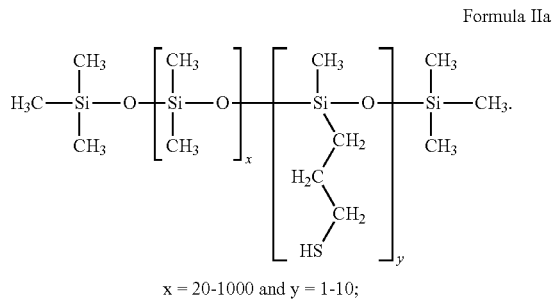

Formula IIa x = 20-1000 and y = 1-10;

3. The tape of claim 2 wherein the reaction product consists of from about 15 to about 40 wt. % of the mercapto-functional silicone macromer, based on the total weight of the reactants.

4. The tape of claim 3 wherein the reaction product consists of from about 20 to about 30 wt. % of the mercapto-functional silicone macromer, based on the total weight of the reactants.

5. The tape of claim 1 wherein the low adhesion backsize consists of the reaction product of the mercapto-functional silicone macromer with the (meth)acrylic monomers and/or oligomers.

6. The tape of claim 5 wherein the (meth)acrylic monomers include (meth)acrylic monomers with a $T_g$ of less than 20° C., (meth)acrylic monomers with a $T_g$ of greater than 70° C., and (meth)acrylic acid monomers.

7. The tape of claim 5 wherein the (meth)acrylic monomers consist of methyl methacrylate monomers, methyl acrylate monomers, and methacrylic acid monomers.

8. The tape of claim 1 wherein the low adhesion backsize has a $T_g$ in the range of from about 20° C. to about 60° C.

9. The tape of claim 1 wherein the low adhesion backsize is disposed on the first major side of the backing is derived from a water-borne coating.

10. The tape of claim 1 wherein the polyolefinic backing is a polyethylenic backing.

11. The tape of claim 10 wherein the polyethylenic backing is a blend of low density polyethylene and high density polyethylene.

12. The tape of claim 11 wherein the blend is at a weight ratio of from about 20:80 to about 40:60 of low density polyethylene to high density polyethylene.

13. The tape of claim 1 wherein the tape is in the form of a self-wound roll in which a major surface of the pressure-sensitive adhesive is in releasable contact with a major surface of the low adhesion backsize.

14. The tape of claim 1 wherein the tape has an unwind force of between about 9 oz/inch and about 16 oz/inch.

15. The tape of claim 1 wherein at least some of the lines of weakness are oriented within plus or minus 5 degrees of the transverse axis of the backing.

16. A method of painting a first surface portion while masking a second surface portion so that it is not painted, the method comprising:
adhesively attaching a length of the hand-tearable masking tape of claim 1 to the second surface portion and then applying liquid paint to at least the first surface portion.

17. The tape of claim 1, wherein the tape is transversely curvable.

* * * * *

UNITED STATES PATENT AND TRADEMARK OFFICE
CERTIFICATE OF CORRECTION

PATENT NO. : 9,663,684 B2
APPLICATION NO. : 13/474133
DATED : May 30, 2017
INVENTOR(S) : Joseph Bartusiak It is certified that error appears in the above-identified patent and that said Letters Patent is hereby corrected as shown below:

On the Title Page

Column 2 (Other Publications)
Line 2, Delete "retrived" and insert -- retrieved --, therefor.
Line 4, Delete "retrived" and insert -- retrieved --, therefor.
Line 6, Delete "retrived" and insert -- retrieved --, therefor.
Line 11, Delete "retrived" and insert -- retrieved --, therefor.

In the Specification

Column 13
Lines 1-7, Delete "In still further embodiments, the amount of methacrylic acid in such compositions is between 2 and 16 wt. %, or between 5 and 10 wt. %. (These and other weight percentages of reactants listed herein are relative to the total reactants, not including any solvent or other components that may be present in the reaction mixture or the low adhesion backsize product, unless otherwise noted)." and insert the same in Column 12, Line 67 as a continuation of the same paragraph.

Column 15
Lines 4-20, Delete "Pressure-sensitive adhesive 300 can be disposed (e.g., as a layer) on second major side 200 of backing 2, e.g. by using coater 433. Outwardmost surface 301 of pressure-sensitive adhesive 300 may be exposed so that it can later be contacted with outwardmost surface 104 of low adhesion backsize 103 (e.g., when tape 1 is rolled up into a self-wound roll); inwardmost surface 302 can be in direct or indirect contact with second major surface 215 of backing 2 (e.g., any intermediate layer, treatment, etc. can be applied to the second major surface of backing 2 if desired, before the deposition of pressure-sensitive adhesive 300). The deposition of pressure-sensitive adhesive 300 can be in-line in the same process as the molding of backing 2 and/or deposition of low Signed and Sealed this
Sixth Day of March, 2018

Andrei Iancu
*Director of the United States Patent and Trademark Office* adhesion backsize 103, as in the exemplary configuration of FIG. 14. Or, it can be done off-line, in a separate process." and insert the same on Column 15, Line 5, as a new paragraph.

Column 18
Line 59, Before "filed" insert -- Attorney Docket No. 67823US002, --.

In the Claims

Column 30
Line 16, In Claim 9, before "disposed" delete "is".